(12) United States Patent
Drucker

(10) Patent No.: US 8,451,093 B2
(45) Date of Patent: *May 28, 2013

(54) RFID TAG, INTERROGATOR AND SYSTEM WITH IMPROVED SYMBOL ENCODING AND DECODING

(75) Inventor: Vitaly Drucker, Stamford, CT (US)

(73) Assignee: Vital Wireless, LLC, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/347,907

(22) Filed: Jan. 11, 2012

(65) Prior Publication Data

US 2012/0112885 A1    May 10, 2012

Related U.S. Application Data

(63) Continuation of application No. 12/161,080, filed as application No. PCT/US2007/061290 on Jan. 30, 2007, now Pat. No. 8,120,465.

(60) Provisional application No. 60/764,111, filed on Feb. 1, 2006, provisional application No. 60/804,368, filed on Jun. 9, 2006.

(51) Int. Cl.
G08B 21/00    (2006.01)

(52) U.S. Cl.
USPC ..... 340/10.1; 340/10.2; 340/572.1; 340/5.61; 340/505; 375/279; 375/282; 375/283; 455/73; 455/106

(58) Field of Classification Search
USPC .... 340/10.1, 10.2, 572.1, 5.61, 505; 375/279, 375/282, 283; 455/73, 106
See application file for complete search history.

(56) References Cited

U.S. PATENT DOCUMENTS

| | | | |
|---|---|---|---|
| 3,997,847 A | 12/1976 | Tong | |
| 5,399,987 A | 3/1995 | Yamamoto et al. | |
| 5,692,007 A * | 11/1997 | Durrant et al. | 375/142 |
| 5,778,031 A | 7/1998 | Hiramatsu | |
| 5,784,686 A | 7/1998 | Wu et al. | |
| 5,892,797 A | 4/1999 | Deng | |
| 6,031,862 A | 2/2000 | Fullerton et al. | |
| 6,456,668 B1 | 9/2002 | MacLellan et al. | |
| 6,587,517 B1 | 7/2003 | Li et al. | |
| 6,608,552 B1 | 8/2003 | Fogel et al. | |
| 6,938,200 B2 | 8/2005 | Pax et al. | |
| 6,950,009 B1 | 9/2005 | Nysen | |
| 7,049,964 B2 | 5/2006 | Hyde et al. | |
| 2004/0014424 A1 | 1/2004 | Kristensson et al. | |
| 2004/0201457 A1 | 10/2004 | O'Toole et al. | |

(Continued)

FOREIGN PATENT DOCUMENTS

EP    0915573    5/1999

OTHER PUBLICATIONS

Digitally Demodulating Binary Phase Shift Keyed Data Signals, C. Kikkert and C. Blackburn, Information and Comunication Security, 2nd Int'l Conference, ICICS99, 1999.

(Continued)

*Primary Examiner* — Mohammad Ghayour
*Assistant Examiner* — Mark Rushing
(74) *Attorney, Agent, or Firm* — Gordon & Jacobson, PC

(57) ABSTRACT

An improved RFID Tag, Interrogator, and system wherein at least one tag modulates a radio frequency signal by modulated backscatter operations.

11 Claims, 20 Drawing Sheets

U.S. PATENT DOCUMENTS

2005/0099270 A1    5/2005    Diorio
2005/0143671 A1    6/2005    Hastings et al.
2007/0177694 A1*  8/2007    Okunev et al. ................ 375/333

OTHER PUBLICATIONS

"860MHz-930MHz Class I Radio Frequency Identification Tag Radio Frequency & Logical Communication Interface Specification Candidate Recommendation", Auto-ID Center, 2002.
Noncoherent Communication With Waveforms, Marvin Simon, Digital Communication Techniques: Signal Design and Detection, Chapter 5, Prentice Hall, 1994.
"Digital Modulation in Communications Systems-An Introduction", Application Note 1298, Hewlett-Packard Company, Jul. 1997.
EPC™ Radio-Frequence Identity Protocols Class-1 Generation-2 UHF RFID Protocol for Communications at 860 MHz-960 MHz, Version 1.0.9, EPCglobal Inc., 2004.
"FSK: Signals and Demodulation", Bob Watson, Copyright® 1980 Watkins-Johnson Company, vol. 7 No. 5 Sep./Oct. 1980.
"A Radio-Oriented Introduction to RFID-Protocols, Tags and Applications" Daniel M. Dobkin, Titus Wandinger, Aug. 2005 High Frequency Electronics, 2005 Summit Technical Media.
"Passive, Battery-assisted Passive and Active Tags: A Technical Comparison" © 2005 Intelleflex Corporation.
Digital Receivers: Symbol-Timing Recovery for QPSK, Jones, Appadwedula, Berry, Haun, Janevits, Kramer, Moussa, Sachs, Wade, The Connexions Project,Version 2.14: Oct. 11, 2004.
"Minimum Shift Keying: A Spectrally Efficient Modulation", Subbarayan Pasupathy, IEEE Communications Magazine, Jul. 1979.
PSK Demodulation (Part 1) J. Mark Steber, The Communications Edge™, vol. 11 No. 2 Mar./Apr. 1984.
PSK Demodulation (Part 2) J. Mark Steber, The Communications Edge™, vol. 11 No. 2 Mar./Apr. 1984.
Transmitter & Receiver Architectures, Andrew Bateman, Radio Design Course, downloaded Nov. 2, 2005, http://www.avren.com/Courses/TX_RX_Architectures_plain.htm.
"Bringing Long-Range UHF RFID Tags Into Mainstream Supply Chain Applications" Rob Glidden, John Schroeter, wwe.rfdesign.com, Jul. 2005.
UHF Gen 2 System Overview, Texas Instruments, JAG. Mar. 2005.
Proposed Changes, Impinj, dated Mar. 8, 2005, available from www.antoid.org.

* cited by examiner

S₀ Reference Waveform-Odd      (data=0)

S₀ Reference Waveform-Even      (data=0)

Composite S₀ Reference Waveform      (data=0)

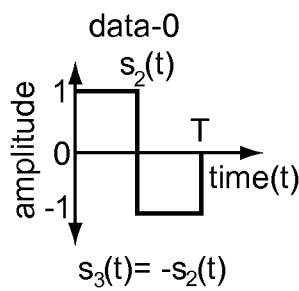
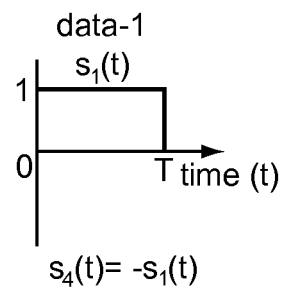
*Fig. 3A1*   *Fig 3A2*
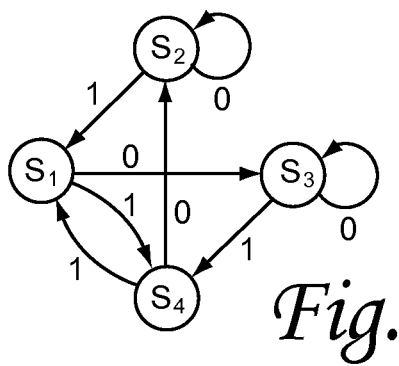
*Fig. 3B*
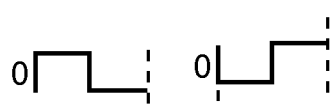
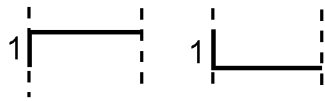
*Fig. 3C*
*Fig. 3D*
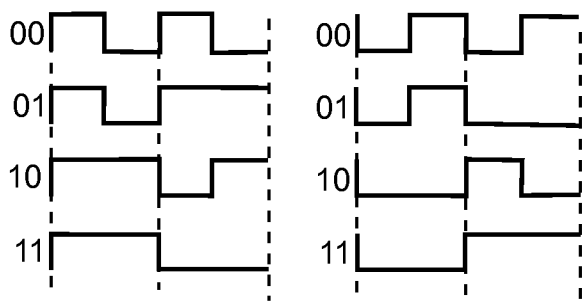

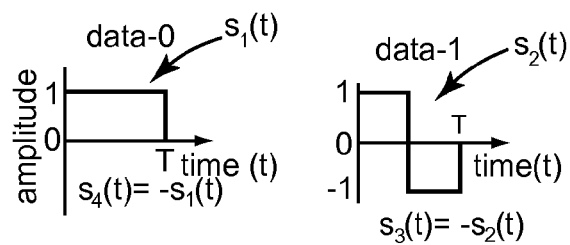
Fig. 4A1    Fig. 4A2
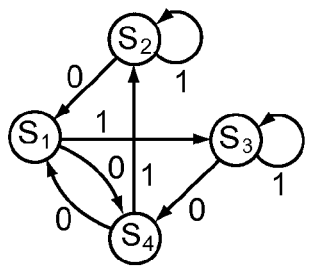
Fig. 4B
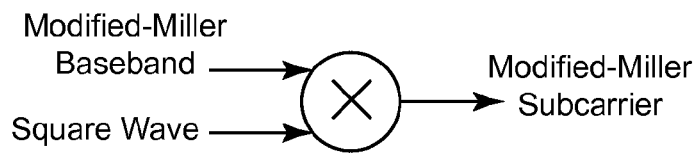
Fig. 4C
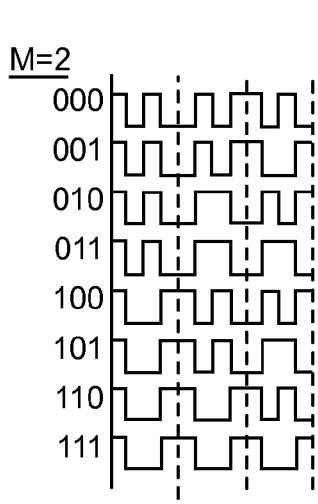
Fig. 4D
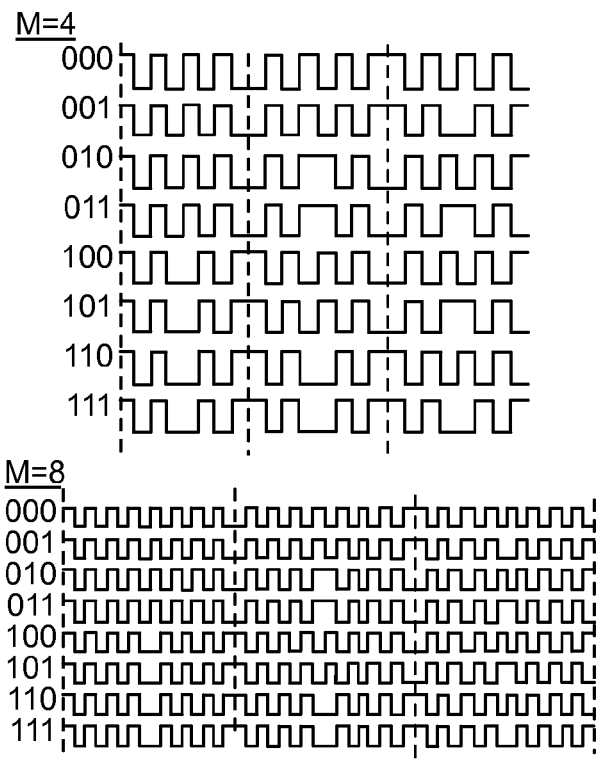

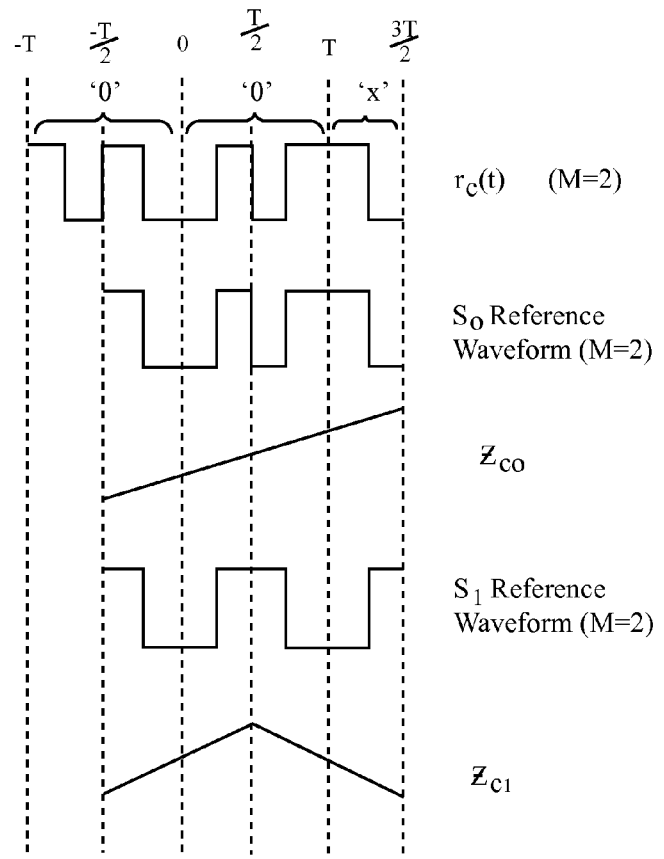
*Fig. 16A1*    $r_c(t)$    (M=2)
*Fig. 16A2*    $S_0$ Reference Waveform (M=2)
*Fig. 16A3*    $z_{c0}$
*Fig. 16A4*    $S_1$ Reference Waveform (M=2)
*Fig. 16A5*    $z_{c1}$
Modified Miller Preamble (TRext = 0)
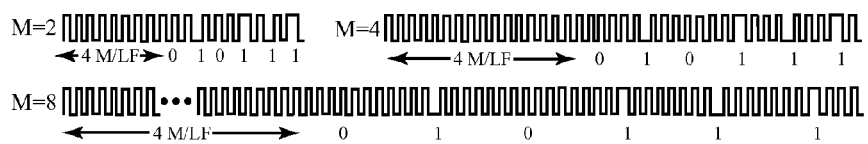
*Fig. 7A*
Modified Miller Preamble (TRext = 1)
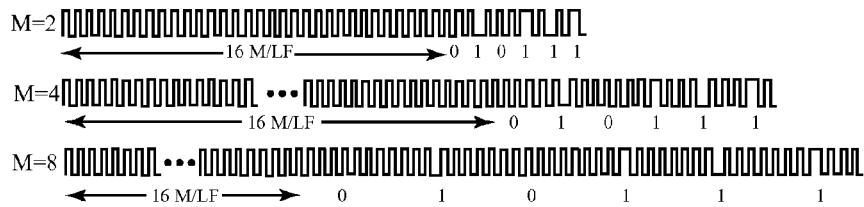
*Fig. 7B*

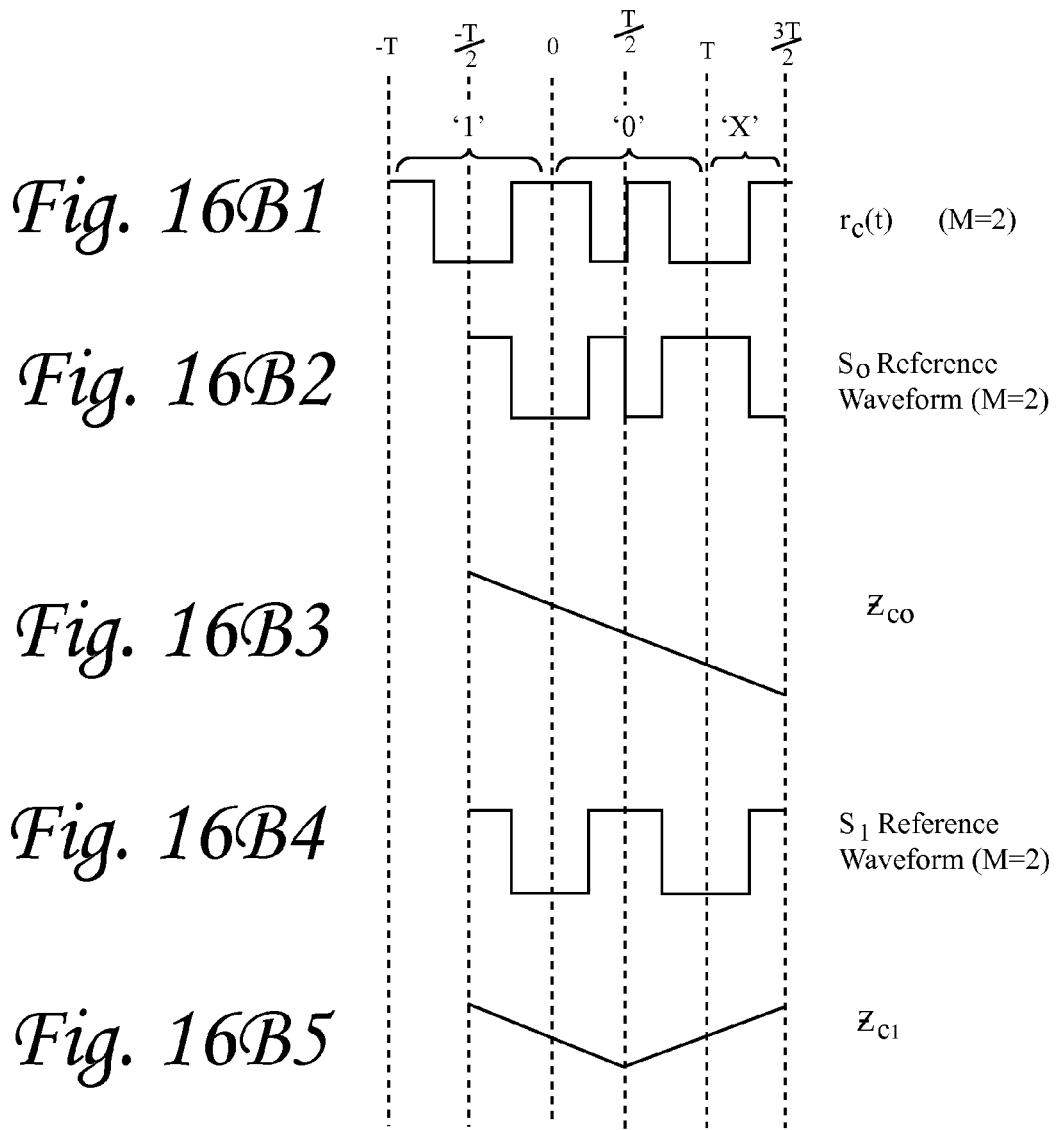
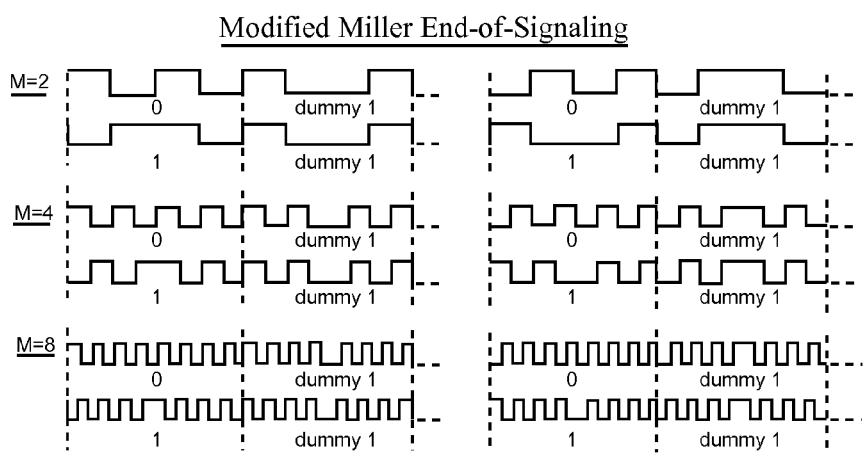
Fig. 7C

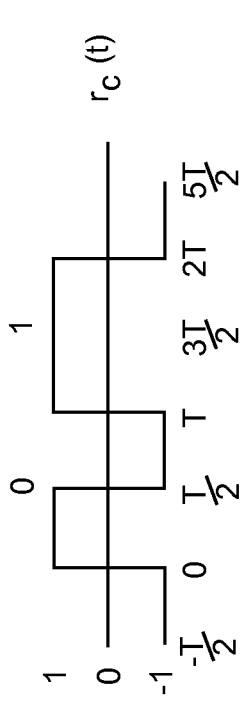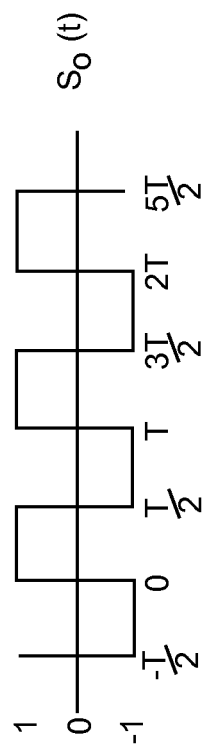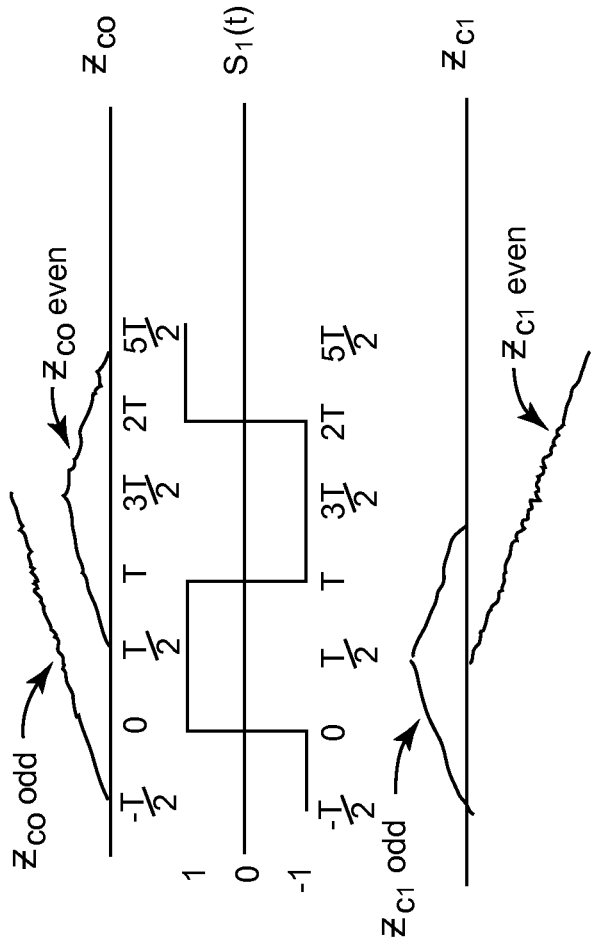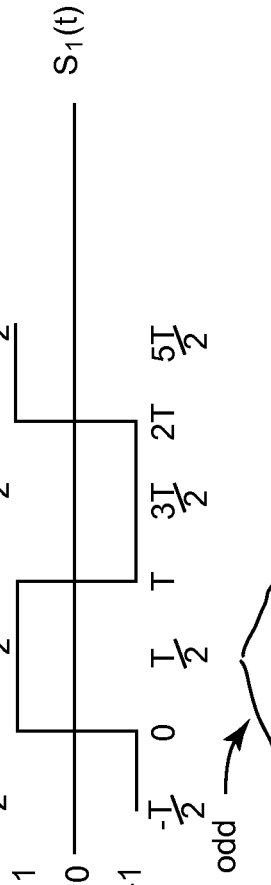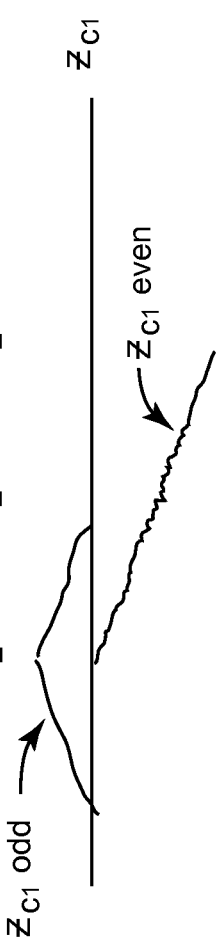
Fig. 11A
Fig. 11B
Fig. 11C
Fig. 11D
Fig. 11E

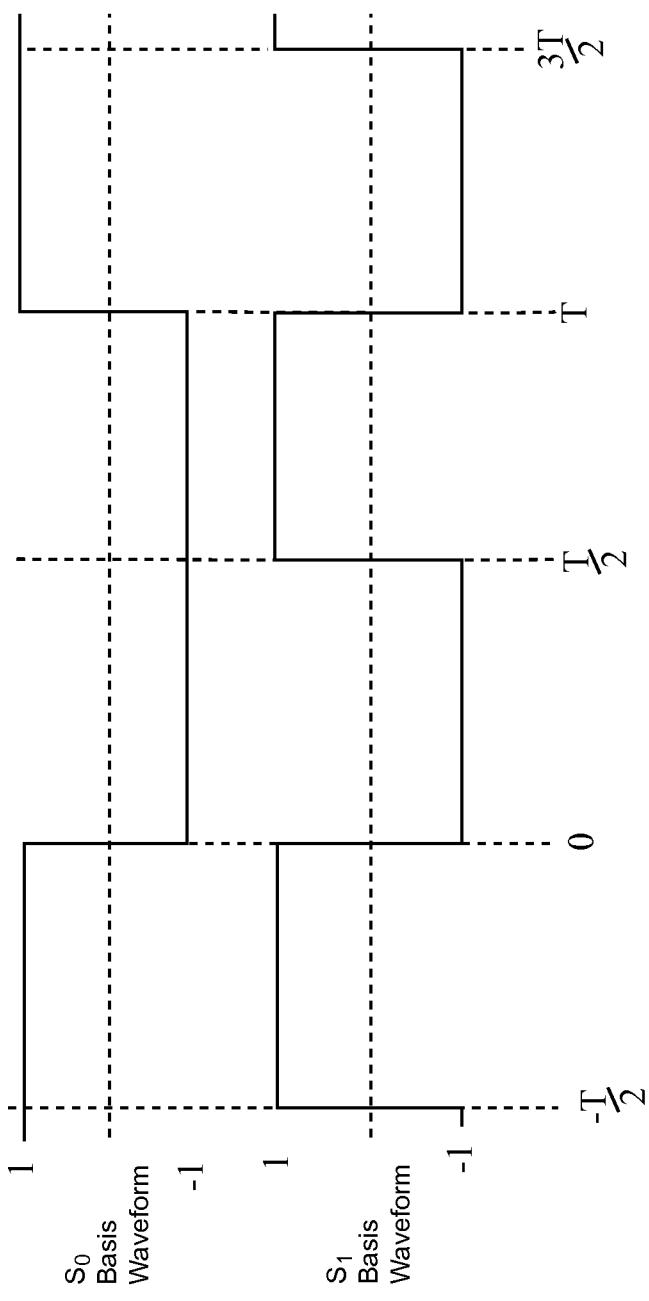
Fig. 15A1
Fig. 15A2
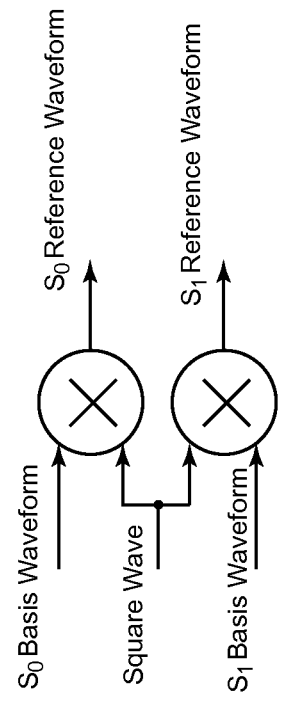
Fig. 15B

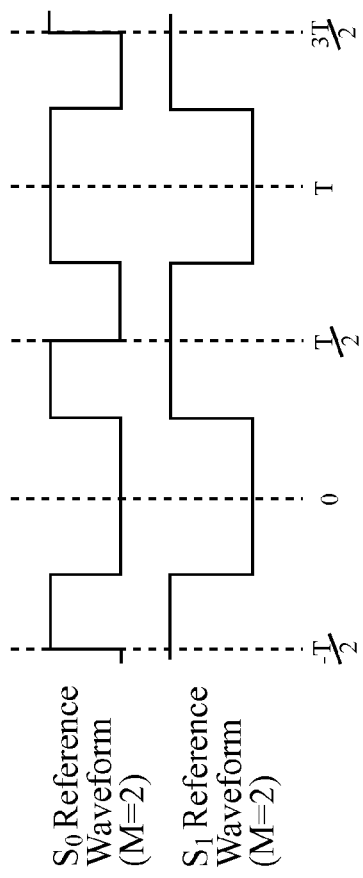
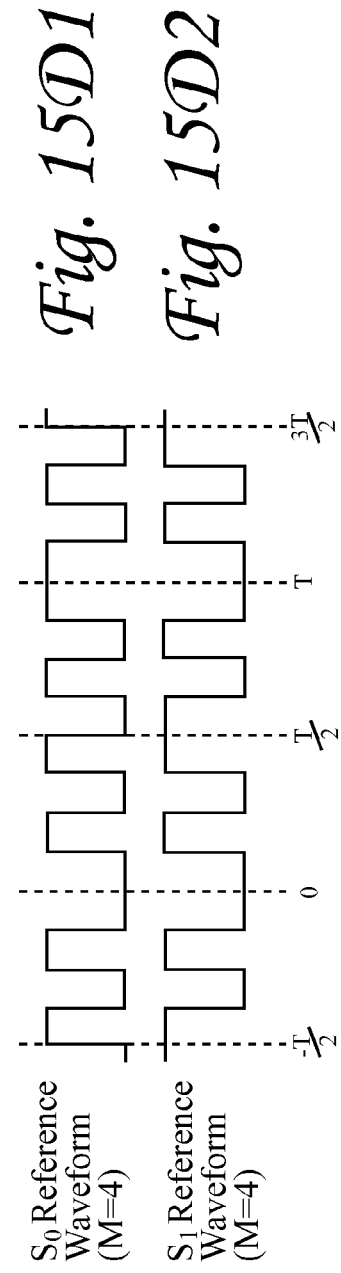
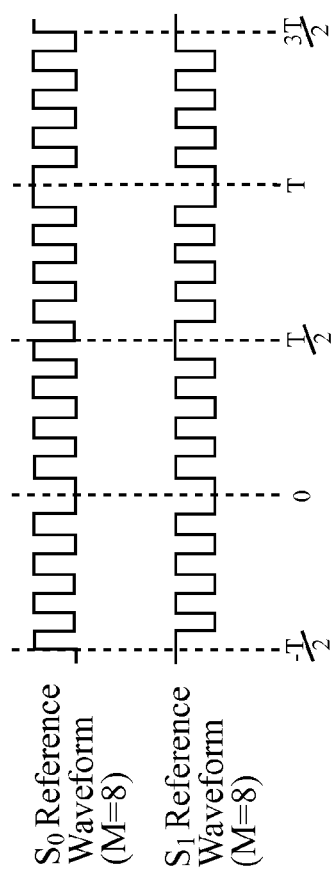
Fig. 15C1
Fig. 15C2
Fig. 15D1
Fig. 15D2
Fig. 15E1
Fig. 15E2

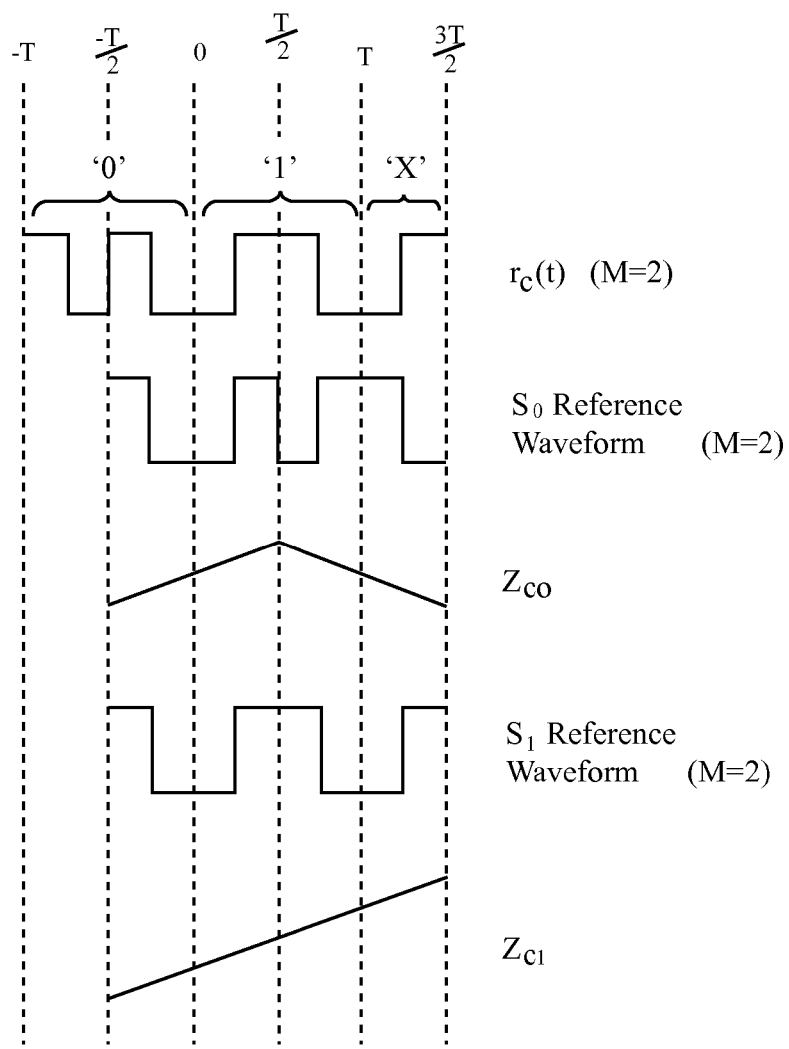

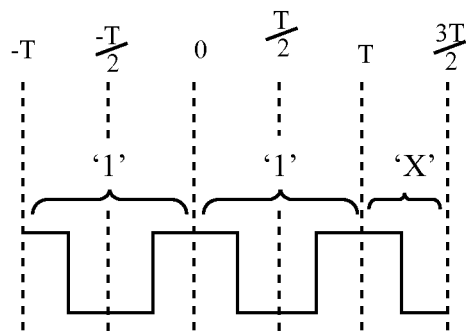
*Fig. 16D1*    $r_c(t)$ (M=2)
*Fig. 16D2*    $S_0$ Reference Waveform (M=2)
*Fig 16D3*    $z_{c0}$
*Fig. 16D4*    $S_1$ Reference Waveform (M=2)
*Fig. 16D5*    $z_{c1}$

RFID TAG, INTERROGATOR AND SYSTEM WITH IMPROVED SYMBOL ENCODING AND DECODING

CROSS-REFERENCE TO RELATED APPLICATIONS

The present application is a continuation of U.S. application Ser. No. 12/161,080, filed on Jul. 16, 2008 now U.S. Pat. No. 8,120,465, which is a 371 national stage entry of International Application Number PCT/US2007/061290, filed on Jan. 30, 2007 and claiming priority from U.S. Provisional App. No. 60/764,111, filed Feb. 1, 2006 and U.S. Provisional App. No. 60/804,368 filed on Jun. 9, 2006, herein incorporated by reference in their entireties.

BACKGROUND OF THE INVENTION

1. Field of the Invention

This invention relates broadly to wireless communication systems and, more particularly, to encoding and decoding of a backscatter radio frequency signal in a radio frequency identification system.

2. State of the Art

Radio Frequency Identification (RFID) systems are used for identification and/or tracking of equipment, inventory, or living things. RFID systems are radio communication systems that communicate between a radio transceiver, called an Interrogator, and a number of inexpensive devices called Tags. The objectives of RFID systems are to design a reliable and secure architecture, and to minimize the total cost of the Interrogator and the Tags, while meeting the system performance requirements.

In RFID systems, the Interrogator communicates to the Tags using modulated radio signals, and the Tags respond with modulated radio signals. For downlink communication from the Interrogator to a Tag, the Interrogator transmits a modulated radio signal that encodes the Interrogator's message. The Tag receives the modulated radio signal and demodulates and decodes the Interrogator's message therefrom. For uplink communication from a Tag to the Interrogator, the Interrogator transmits a continuous-wave (CW) carrier signal. The CW carrier signal can be a frequency-hopping spread-spectrum (FHSS) carrier signal as is well known, thereby enhancing the system's ability to operate in a multipath environment. The Tag modulates the CW carrier signal using modulated backscattering operations whereby the antenna is electrically switched from being an absorber of RF radiation to being a reflector of RF radiation, thereby encoding the Tag's information onto the CW carrier signal. The Interrogator receives the incoming modulated CW carrier signal and demodulates and decodes the Tag's information message therefrom. The uplink and downlink communication occurs in a half-duplex manner such that a Tag will not perform communication while it is waiting for communication from an Interrogator and also will not interpret communication from the Interrogator while it is communicating. The Tag can be a passive-type tag that obtains its operating energy by rectifying the RF energy transmitted by the Interrogator and received at the Tag's antenna. Alternatively, the Tag can be a semi-passive tag (sometimes referred to as semi-active tag) that is equipped with at least one battery to provide operating energy to the Tag.

As described above, the Interrogator operates to receive the reflected and modulated CW carrier signal and demodulate and decode the Tag information message encoded therein. Typically, such functionality is accomplished by homodyne detection wherein the received signal is amplified with a low noise amplifier whose output is mixed by a quadrature mixer that uses the same RF signal source as the transmit functionality. The in-phase (I) and quadrature (Q) components output from the quadrature phase mixer are filtered and processed by a data recovery circuit. The data recovery circuit can be realized in many different ways including both analog, digital and hybrid analog/digital implementations. Typically, these implementations perform integrate and dump operations whereby the signal energy of the I component and/or Q component is (are) accumulated during a symbol period. The accumulated value(s) is (are) supplied to a symbol decision comparator that produces the demodulated data stream. An example of such a receiver implementation is described in U.S. Pat. No. 6,456,668 to MacLellan et al.

Disadvantageously, the integrate and dump methodology of the prior art receiver designs has poor performance because it provides limited knowledge of the energy of the signal as well as the noise process of the communication channel. These limitations reduce the signal to noise ratio of the receiver subsystem, which results in increased signal power at the Tag (or decreased read range of the system) in order to maintain a prescribed bit error rate. The increased signal power at the Tag is typically realized by a larger Tag antenna, which increases the size and costs of the Tag.

Therefore, there remains a need in the art for RFID Tags, Interrogators and systems that provide improved receiver performance (i.e., an improved signal to noise ratio) which allows for reduced signal power at the Tag (or a larger read range of the system) while maintaining a prescribed bit error rate. Such improved receiver performance advantageously will not require an increase in the size and cost of the Tag.

SUMMARY OF THE INVENTION

It is therefore an object of the invention to provide an RFID Tag, Interrogator, and system that provide improved receiver performance (i.e., an improved signal to noise ratio). Such improved performance allows for reduced signal power at the Tag (or a larger read range of the system) while maintaining a prescribed bit error rate. The reduction of signal power at the Tag allows for smaller and less costly Tag designs while maintaining the prescribed bit error rate of the system.

It is another object of the invention to provide such an RFID Tag, Interrogator, and system that employ a form of biphase encoding for uplink communication from the Tag to the Interrogator.

It is a further object of the invention to provide such an RFID Tag, Interrogator, and system that employ a form of a modulated subcarrier encoding for uplink communication from the Tag to the Interrogator.

In accord with these objects, which will be discussed in detail below, a Tag is provided for use in a radio frequency identification system. As part of uplink communication from the Tag to an Interrogator, the Tag generates an uplink signal that represents a sequence of symbols. In a first mode of operation, the uplink signal is generated in accordance with a first signaling scheme wherein the uplink signal is derived by multiplying a first-type bi-phase baseband waveform by a square wave. The first-type bi-phase baseband waveform has a phase inversion at least on every symbol boundary and has a first symbol rate SR1, and the square wave has a rate M*SR1, where M is selected from a number of different integer values. In a second mode of operation, the uplink signal is generated in accordance with a second signaling scheme wherein the uplink signal comprises a second-type bi-phase baseband waveform having a phase inversion at least on every symbol boundary and having a second symbol rate SR2. The second symbol rate SR2 is different from the first symbol rate SR1. A modulator cooperates with at least one antennae element of the Tag to modulate a backscatter signal transmitted at the at least one antenna element in accordance with the uplink signal. In the preferred embodiment, the selection of the operational mode (including the selection of the integer value for M) is dictated by command data communicated to the tag as part of an RF signal received at the least one antenna element.

The interrogator includes a transmitter that transmits the radio frequency signal and a receiver that receives, demodulates and decodes the modulated radio frequency signal in order to recover the uplink message therein. The receiver operates in either a first or second mode of operation. In the first mode of operation, symbol decoding operations are performed that decode a given symbol by generating a first set of reference waveforms that are derived by multiplying first-type bi-phase baseband waveforms by a square wave. The first-type bi-phase baseband waveforms each have a phase inversion at least on every symbol boundary and each have a first symbol rate SR1, and the square wave has a rate M*SR1, where M is selected from a number of different integer values. In a second mode of operation, symbol decoding operations are performed that decode a given symbol by generating a second set of reference waveforms that comprise second-type bi-phase baseband waveforms each having a phase inversion at least on every symbol boundary and each having a second symbol rate SR2. The second symbol rate SR2 is different from the first symbol rate SR1.

In the preferred embodiment, the symbol decoding operations of the first mode process portions of a component of the modulated radio frequency signal that are received over a first extended processing window. The first extended processing window is significantly greater than the first symbol period dictated by the first symbol rate SR1. Most preferably, the first extended processing window has a time duration that is two times the first symbol period. Similarly, the symbol decoding operations of the second mode process portions of a component of the modulated radio frequency signal that are received over a second extended processing window. The second extended processing window is significantly greater than the second symbol period dictated by the second symbol rate SR2. Most preferably, the second extended processing window has a time duration that is two times the second symbol period.

It will be appreciated that such dual-mode Tag-to-Interrogator signaling provides improved receiver performance (i.e., an improved signal to noise ratio). Such improved performance allows for reduced signal power at the Tag (or a larger read range of the system) while maintaining a prescribed bit error rate. The reduction of signal power at the Tag allows for smaller and less costly Tag designs while maintaining the prescribed bit error rate of the system.

According to one embodiment of the invention, the symbol decoder includes multiplication means for samplewise multiplication of portions of the component of the modulated radio frequency signal with portions of the corresponding reference waveforms in the selected operational mode; and accumulation means for accumulating results of the multiplication means over the extended processing windows in the selected operational mode. In digital implementations, the samplewise multiplication may be realized by changing the sign of samples of the modulated radio frequency signal component in accordance with the reference waveform(s) portions.

According to another embodiment of the invention, the symbol decoding operations employ multiple signal processing paths for carrying out odd symbol processing in parallel with even symbol processing.

According to yet another embodiment of the invention, the symbol decoding operations employ signal processing paths that each employ a respective storage cell for storing the accumulation results from the previous processing window. The stored accumulation results are added to the accumulation results of the current processing window for carrying out symbol processing in the extended processing window of the selected operational mode.

Additional objects and advantages of the invention will become apparent to those skilled in the art upon reference to the detailed description taken in conjunction with the provided figures.

BRIEF DESCRIPTION OF THE DRAWINGS

FIGS. 3A1 and 3A2 are pictorial illustrations of basis functions for generating an FM0 baseband waveform, which may be used for Tag-to-Interrogator signaling in the RFID system of FIG. 1.

FIG. 3B is a state diagram that is used in conjunction with the basis functions of FIGS. 3A1 and 3A2 to generate an FM0 baseband waveform.

FIG. 3C is a pictorial illustration of the data-0 and data-1 symbols of an FM0 baseband waveform.

FIG. 3D is a pictorial illustration of symbol sequences of FM0 baseband waveforms.

FIGS. 4A1 and 4A2 are pictorial illustrations of basis functions for generating a Modified-Miller baseband waveform.

FIG. 4B is a state diagram that is used in conjunction with the basis functions of FIGS. 4A1 and 4A2 to generate a Modified-Miller baseband waveform.

FIG. 4C is a functional block diagram that illustrates the multiplication of the Modified-Miller baseband waveform by a high rate square wave to generate a Modified-Miller subcarrier waveform, which may be used for Tag-to-Interrogator signaling in the RFID system of FIG. 1.

FIG. 4D is a pictorial illustration of symbol sequences of Modified-Miller subcarrier waveforms.

FIGS. 7A and 7B are pictorial illustrations of two different sets of preamble waveforms that precede one or more reply data fields as part of Tag-to-Interrogator signaling in the RFID system of FIG. 1 in those instances where Modified-Miller-subcarrier-type Tag-to-Interrogator signaling is employed.

FIG. 7C is a pictorial illustration of an end-of-signaling waveform that terminates Modified-Miller-subcarrier-type Tag-to-Interrogator signaling.

FIGS. 11A to 11E are signal waveforms that describe the signal processing operations carried out by the data recovery circuit of FIG. 8.

FIGS. 15A1 and 15A2 are pictorial illustrations of an $S_0$ basis waveform and an $S_1$ basis waveform, respectively.

FIG. 15B is a functional block diagram that illustrates the multiplication of the $S_0$ basis waveform and the $S_1$ basis waveform of FIGS. 15A1 and 15A2 by a high rate square wave to derive corresponding $S_0$ and $S_1$ reference waveforms.

FIGS. 15C1 and 15C2 are pictorial illustrations of the $S_0$ and $S_1$ reference waveforms, respectively, which are derived from multiplication by a square wave having a rate that is two times the symbol rate of the S0 and S1 basis waveforms (e.g., M=2), and which can be used for decoding symbols in the data recovery circuit of FIG. 14.

FIGS. 15D1 and 15D2 are pictorial illustrations of the $S_0$ and $S_1$ reference waveforms, respectively, which are derived from multiplication by a square wave having a rate that is four times the symbol rate of the S0 and S1 basis waveforms (e.g., M=4), and which can be used for decoding symbols in the data recovery circuit of FIG. 14.

FIGS. 15E1 and 15E2 are pictorial illustrations of the $S_0$ and $S_1$ reference waveforms, respectively, which are derived from multiplication by a square wave having a rate that is eight times the symbol rate of the S0 and S1 basis waveforms (e.g., M=8), and which can be used for decoding symbols in the data recovery circuit of FIG. 14.

FIGS. 16A1 to 16A5 are signal waveforms that describe the signal processing operations carried out by the data recovery circuit of FIG. 14 for the particular symbol sequence {0,0,x}.

FIGS. 16B1 to 16B5 are signal waveforms that describe the signal processing operations carried out by the data recovery circuit of FIG. 14 for the particular symbol sequence {1,0,x}.

FIGS. 16C1 to 16C5 are signal waveforms that describe the signal processing operations carried out by the data recovery circuit of FIG. 14 for the particular symbol sequence {0,1,x}.

FIGS. 16D1 to 16D5 are signal waveforms that describe the signal processing operations carried out by the data recovery circuit of FIG. 14 for the particular symbol sequence {1,1,x}.

DETAILED DESCRIPTION OF THE PREFERRED EMBODIMENTS

Figure 1:
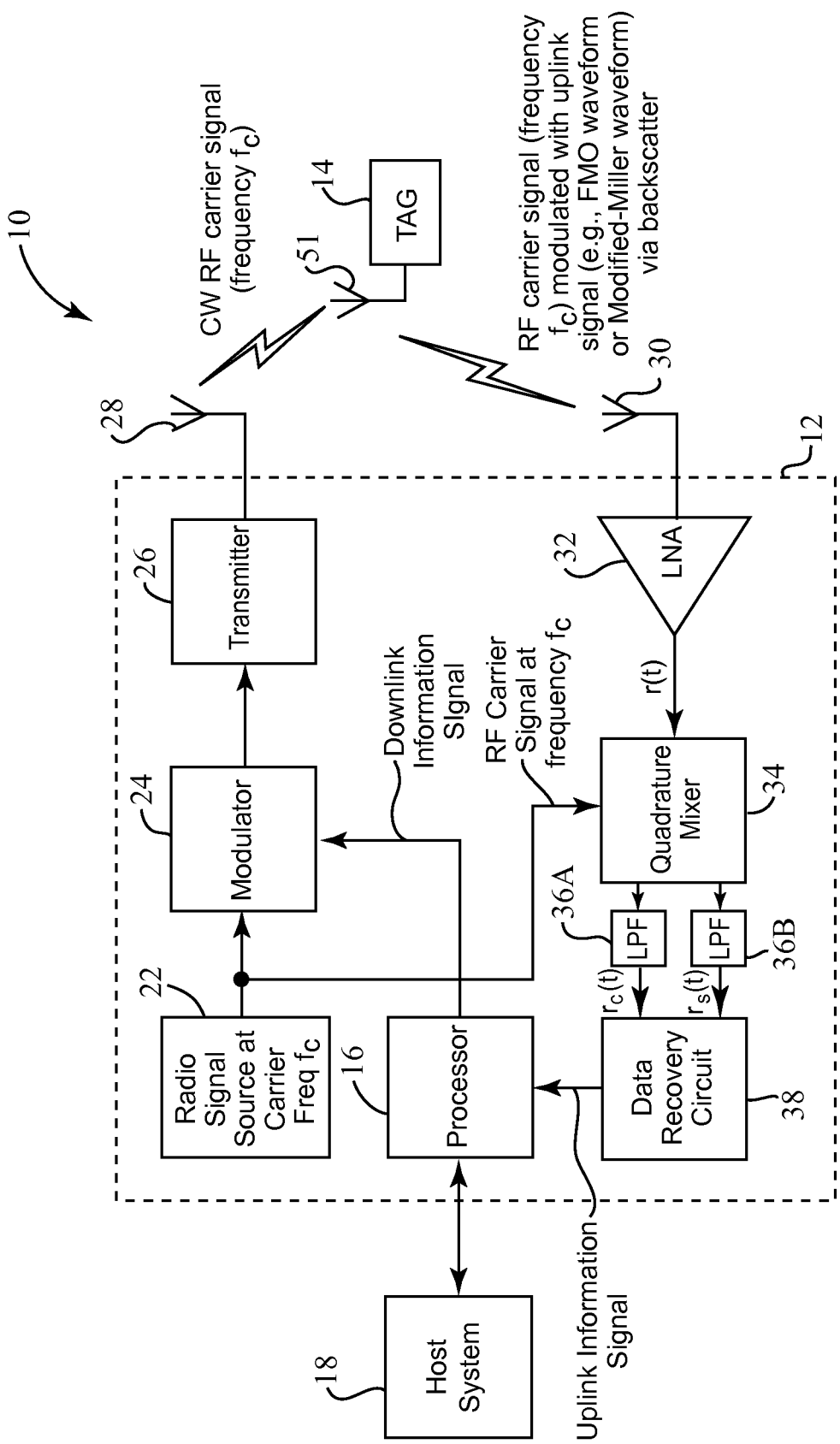
FIG. 1 is a functional block diagram of an RFID system in which the present invention can be embodied.

Turning now to FIG. 1, there is shown an RFID system 10 that embodies the present invention. The RFID system 10 includes an Interrogator 12 that operates to read information from a Tag 14 affixed to a sensor, container, rack, pallet, or object (not shown). Typically, the Tag 14 is moved across the reading field of the Interrogator 12, although the Tag 14 may be stationary and the Interrogator 12 may be moving, or both may be moving or stationary. The reading field is defined as that volume of space within which successful communications between the Interrogator 12 and the Tag 14 can take place. While the Tag 14 is in the reading field, the Interrogator 12 and the Tag 14 must complete their information exchange before the Tag 14 moves out of the reading field.

The Interrogator 12 includes a Processor 16 that typically interfaces to a host system 18 (e.g., a workstation or possibly a network interface that provides for communication to a remote system via a data network). The Processor 16 manages the communication interface between the Interrogator 12 and the Tag 14. The host system 18 interfaces with the Processor 16 and directs the communication between the Interrogator 12 and the Tag 14. In response to control commands supplied by the host system 18, the Processor 16 generates commands (e.g., Select, Query, Read, Write, Kill) that are formatted and encoded within a Downlink Information Signal 20 to be sent to the Tag 14. Signal Source 22 generates a continuous-wave RF carrier signal with a center frequency designated $f_c$. Modulator 24 modulates the Downlink Information Signal 20 onto the continuous-wave RF carrier signal, and the Transmitter 26 sends this modulated RF signal via Antenna 28 to the Tag 14.

The Tag 14 includes an Antenna 51 (for example, a loop or patch antenna) that receives the modulated RF carrier signal. This signal is demodulated to a baseband signal using a detector/modulator (not shown), which is typically realized by a single Schottky diode. The diode should be appropriately biased with the proper current level in order to match the impedance of the diode and the Antenna 51 such that losses of the radio signal are minimized. The result of the diode detector is essentially a demodulation of the incoming signal directly to baseband. The binary levels of the baseband signal together with the relevant timing information (e.g., the bit clock) are recovered from the baseband signal to thereby reproduce the Downlink Information Signal 20. This information is typically supplied to a processor (not shown), which is typically realized by an inexpensive 4-bit or 8-bit microprocessor, that processes the Downlink Information Signal 20 to recover the particular command therein. The microprocessor then performs certain operations that are dictated by the particular command and generates a reply corresponding thereto. For example, the microprocessor typically performs memory access operations that retrieves identification data (e.g., EPC data) stored in persistent memory in response to a Read command, and adds the retrieved identification data to the reply. The reply is formatted and encoded within an Uplink Information Signal 40 to be sent from the Tag 14 back to the Interrogator 12. The Tag modulates the received CW carrier signal using modulated backscattering operations whereby the antenna is electrically switched from being an absorber of RF radiation to being a reflector of RF radiation. Such modulated backscatter operations modulate the Uplink Information Signal 40 onto the received CW carrier signal. The Interrogator 14 receives the incoming modulated CW carrier signal via antenna 30, demodulates and decodes the Uplink Information Signal 40 therefrom, extracts the Tag's reply message from the Uplink Information Signal 40, and processes the Tag's reply message in order to determine subsequent control operations, all as described in detail hereinafter In the preferred embodiment, the downlink and certain uplink communications between the Interrogator 12 and Tag 14 (including the physical layer, data-coding methodology, command and response structure, and collision arbitration scheme) are carried out in accordance with a standardized air interface specification promulgated by EPCglobal Inc. entitled "Class-1 Generation 2 UHF RFID Protocol for Communications at 860 MHz-960 MHz", herein incorporated by reference in its entirety. This air interface specification is summarized and referred to below as the EPCglobal UHF protocol.

In accordance with the EPCglobal UHF protocol, downlink communication from the Interrogator 12 to the Tag 14 is carried out by the Radio Signal Source 22 generating an RF carrier in the frequency range between 860 MHz and 960 MHz. The Processor 16 and modulator 24 cooperate to modulate the RF carrier in accordance with the Downlink Information Signal 20 using one of three well-known amplitude modulation schemes (i.e., Double-Side-Band Amplitude Shift Keying (DSB-ASK), Single-Side-Band Amplitude Shift Keying (SSB-ASK), Phase-Reversal Amplitude Shift Keying (PR-ASK)). The Downlink Information Signal 20 utilizes a pulse-interval encoding (PIE)) format. The Transmitter 26 transmits the modulated RF carrier over the Antenna 28. The Tag 14 is capable of receiving the modulated RF carrier and demodulating all three amplitude modulation schemes and decoding the pulse-interval encoded waveforms of the Downlink Information Signal 20. The Tag 14 is a passive-type tag that receives its operating energy from the modulated RF carrier transmitted by the Interrogator 12. The Radio Signal Source 22 may generate a frequency-hopping spread-spectrum (FHSS) carrier signal in order to enhance the system's ability to operate in a multipath environment.

The Tag 14 stores a field-programmable 96-bit electronic product code (EPC) along with other data (e.g., KILL and ACCESS passwords, user-defined data).

Uplink communication from a Tag to the Interrogator is carried out by the Radio Signal Source 22, Modulator 24 and Transmitter 26 cooperating to transmit via the Antenna 28 a continuous-wave RF carrier in the frequency range between 860 MHz and 960 MHz. The CW carrier signal can be a frequency-hopping spread-spectrum (FHSS) carrier signal as is well known, thereby enhancing the system's ability to operate in a multipath environment. As previously mentioned, the Tag 14 modulates the CW carrier signal using modulated backscattering operations whereby the antenna is electrically switched from being an absorber of RF radiation to being a reflector of RF radiation, which modulates the Tag's Uplink Information Signal 40 onto the CW carrier signal.

Figure 2A:
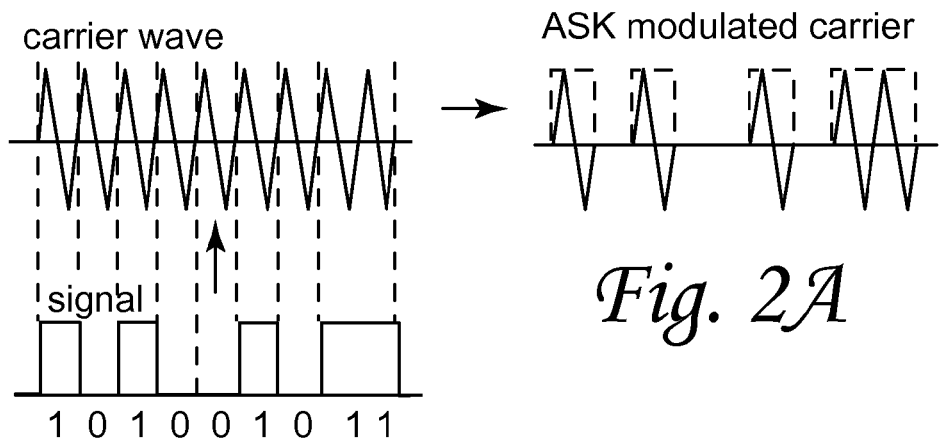
FIG. 2A is a pictorial illustration depicting amplitude shift keying modulation.

The modulated backscattering operations employ either amplitude shift keying (ASK) modulation or phase shift keying (PSK) modulation. ASK modulation is a modulation technique whereby the CW carrier signal is multiplied by a digital signal f(t) as shown in FIG. 2A. Mathematically, the modulated CW carrier signal s(t) is given by the following expression:

$$s(t)=f(t)\sin(2\pi c_c t+\phi).$$

PSK is modulation technique that alters the phase of the CW carrier signal. Mathematically, the modulated CW carrier signal s(t) is given by the following expression:

$$s(t)=\sin(2\pi f_c t+\phi(t)).$$

Figure 2B:
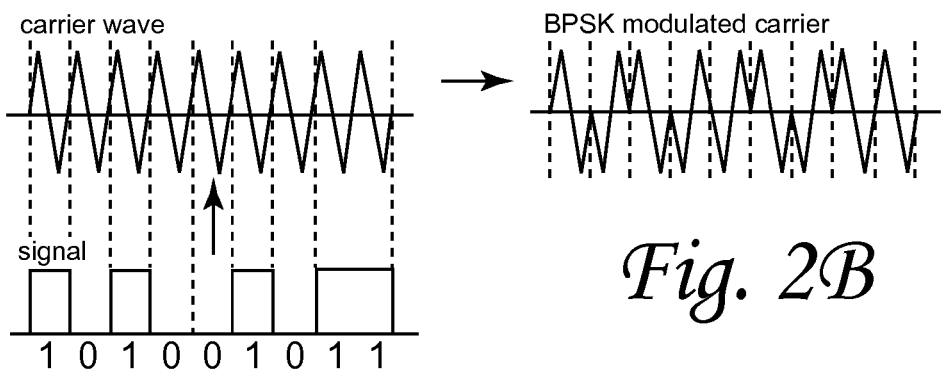
FIG. 2B is a pictorial illustration depicting phase shift keying modulation.

Binary phase-shift-keying (BPSK) utilizes only two phases, 0 and $\pi$. It is therefore a type of ASK with f(t) taking the values −1 or 1. Quadrature phase-shift-keying (QPSK) has four phases, 0, $\pi/2$, $\pi$, and $3\pi/2$. M-ary PSK has M phases, given by 2 $\pi$m/M with m=0,1, . . . (M−1). Binary phase-shift keying is shown in FIG. 2B.

The Tag 14 encodes its Uplink Information Signal 40 as either an FM0 baseband waveform or a Modified-Miller-subcarrier waveform. The FM0 symbols and sequences are well defined in the EPCglobal UHF protocol and shown in FIGS. 3C and 3D. The FM0 baseband waveform inverts its phase at every symbol boundary with the data-0 symbol having an additional mid-symbol phase inversion. The Modified-Miller-subcarrier waveform is similar in many respects to the Miller-subcarrier waveform defined in the EPCglobal UHF protocol, but is modified such it can readily be decoded in a manner similar to the FM0 waveforms. FIG. 4D illustrates the symbols and sequences of the Modified-Miller-subcarrier waveform. As shown in FIGS. 4A1 and 4A2, the Modified-Miller baseband waveform inverts its phase at every symbol boundary with the data-1 symbol having an additional mid-symbol phase inversion. The Modified-Miller-subcarrier waveform is generated by multiplying the Modified-Miller baseband waveform with a square wave at M times the symbol rate as depicted in FIG. 4C. In this manner, the M=2 Modified-Miller-subcarrier waveform contains 2 subcarrier cycles per bit, the M=4 Modified-Miller-subcarrier waveform contains 4 subcarrier cycles per bit, and the M=8 Modified-Miller-subcarrier waveform contains 8 subcarrier cycles per bit.

The receiver subsystem of the Interrogator 12, which is described below in more detail, is capable of demodulating an ASK modulated carrier signal or a PSK modulated carrier signal. The receiver subsystem receives the incoming modulated CW carrier signal and demodulates the modulated CW carrier signal to generate in-phase and quadrature signals.

The binary levels of the in-phase and quadrature signals together with the relevant timing information (e.g., the bit clock) are recovered therefrom to thereby reproduce the Uplink Information Signal 40. The Processor 16 recovers the Tag's reply message from the Uplink Information Signal 40. The Processor 16 selects the uplink signaling scheme (FM0-type signaling or one of the three Modified-Miller-subcarrier-type signaling) and the data rate of the Uplink Information Signal 40 by means of a command (i.e., Query command) communicated from the Interrogator 12 to the Tag 14 via the Downlink Information Signal 20.

The Interrogator 12 and the Tag 14 communicate with one another by a pre-arranged signaling scheme whereby the Interrogator 12 transmits one or more commands (referred to below as Interrogator-to-Tag signaling) and waits for certain replies from the one or more Tags of the system (referred to below as Tag-to-Interrogator signaling). Such reply messages can include randomly-generated data (RN16, which is 16 bits randomly-generated by the Tag), protocol control data (PC data field), identification data (EPC data) stored by the Tag, and error detection data (CRC data) generated by the Tag. More than one Tag may reply to an Interrogator's Query command. In this case, the Interrogator 12 may resolve the collision and issue an ACK command to the selected Tag. Alternatively, the Interrogator 12 may not resolve the collision and issue a QueryAdjust, QueryRep or NAK command, which allows for arbitration of the collided Tags.

Figure 5A:
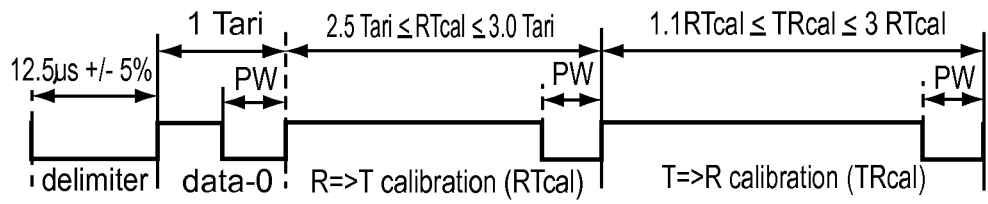
FIG. 5A is a pictorial illustration of a preamble waveform that precedes each Query command as part of Interrogator-to-Tag signaling in the RFID system of FIG. 1.
Figure 5B:
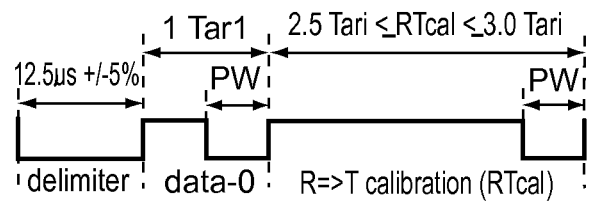
FIG. 5B is a pictorial illustration of a frame-synch waveform that precedes other commands (e.g., Select, ACK, Read, Write, Kill) as part of Interrogator-to-Tag signaling in the RFID system of FIG. 1.

The Processor 16 initiates Interrogator-to-Tag signaling by cooperating with the Signal Source 22, Modulator 24 and Transmitter 26 to transmit via the Antenna 28 a predetermined preamble waveform or a predetermined frame-sync waveform. The preamble waveform comprises a fixed-length start delimiter, a data-0 symbol, an RT calibration waveform, and a TR calibration waveform as shown in FIG. 5A. The frame-sync waveform is identical to the preamble waveform with the TR calibration waveform omitted as shown in FIG. 5B. In FIGS. 5A and 5B, "Tari" is a reference time interval (preferably between 6.25 μs and 25 μs) for Interrogator-to-Tag downlink signaling and is the duration of the data-0 symbol. The duration of the data-1 symbol is in a range between 1.5*Tari and 2.0*Tari. The pulse of the data-0 symbol and the data-1 symbol occurs at the end of the respective symbol with a pulsewidth PW that is preferably less than 0.525*Tari and greater than the maximum of 0.265*Tari and 2 μs. The duration of the RT calibration waveform is equal to the duration of the data-0 symbol plus the duration of a data-1 symbol, which provides a total duration in a range between 2.5*Tari and 3.0*Tari. The Tag measures the length of the RT calibration waveform and uses this measurement for interpreting subsequent symbols communicated from the Interrogator to the Tag. The preamble waveform of FIG. 5A precedes each Query command transmitted from the Interrogator 12 to the Tag 14. The frame-synch waveform of FIG. 5B precedes all other commands (e.g., Select, ACK, Read, Write, Kill) transmitted from the Interrogator 12 to the Tag 14.

Figure 6A:
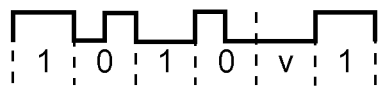
FIGS. 6A and 6B are pictorial illustrations of two different preamble waveforms that precede one or more reply data fields as part of Tag-to-Interrogator signaling in the RFID system of FIG. 1 in those instances where FM0-type Tag-to-Interrogator signaling is employed.
Figure 6B:
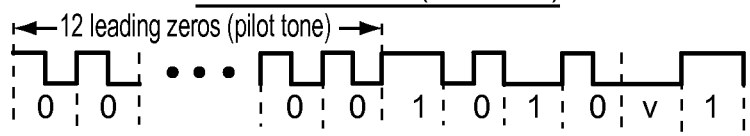
Figure 6C:
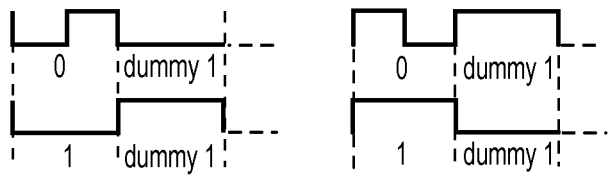
FIG. 6C is a pictorial illustration of an end-of-signaling waveform that terminates FM0-type Tag-to-Interrogator signaling.

For uplink communications employing FM0-type signaling, the Tag 14 initiates Tag-to-Interrogator signaling by generating one of the two preambles shown in FIGS. 6A and 6B. The preamble selection is dictated by the value of a predetermined bit (i.e., the TRext bit) in the Query command communicated from the Interrogator 12 to the Tag 14. The "v" shown in the FIGS. 6A and 6B indicates a signaling violation (i.e., a phase inversion should have occurred but did not). The end of the FM0 Tag-to-Interrogator signaling ends with a "dummy" data-1 symbol as shown in FIG. 6C. The data rate of the FM0 Tag-to-Interrogator signaling can vary between 40 kbps and 640 kbps. This data rate is selected by the Interrogator by the length of the TR calibration waveform (FIG. 5A) and a predetermined bit (i.e., the DR bit) in the Query command communicated from the Interrogator 12 to the Tag 14.

For uplink communication employing Modified-Miller-subcarrier signaling, the Tag 14 initiates Tag-to-Interrogator signaling by generating one of the six preambles shown in FIGS. 7A and 7B. The preamble selection is selected by the value of predetermined bits (i.e., the TRext bit and the 2-bit M field) in the Query command communicated from the Interrogator 12 to the Tag 14. The end of the Modified-Miller-subcarrier signaling ends with a "dummy" data-1 symbol as shown in FIG. 7C. The data rate of the Modified-Miller-subcarrier signaling can vary between 5 kbps and 320 kbps. This data rate is selected by the Interrogator 12 by the length of the TR calibration waveform (FIG. 5A) and predetermined bits (i.e., the DR bit and the 2-bit M field) in the Query command communicated from the Interrogator 12 to the Tag 14.

Returning back to FIG. 1, the receiver subsystem of the Interrogator 12 employs homodyne detection wherein the modulated RF carrier signal is received at the Antenna 30 and amplified with a low noise amplifier 32 whose output is mixed by a quadrature mixer 34 that uses the same RF signal source 22 as the transmit functionality. The in-phase (I) and quadrature (Q) components output from the quadrature phase mixer 34 are low-pass filtered (blocks 36A, 36B) to generate an in-phase signal $r_c(t)$ and a quadrature signal $r_s(t)$ that encode the FM0 waveform or the Modified-Miller-subcarrier waveform transmitted by the Tag 14. A data recovery circuit 38 processes the $r_c(t)$ and $r_s(t)$ signals in order to decode the FM0 waveform or Modified-Miller-subcarrier waveform therein and recover the bit clock timing related thereto, thereby reproducing the Tag's Uplink Information Signal 40. The data recovery circuit 38 can be realized in many different ways including analog, digital, and hybrid analog/digital implementations.

Figure 8:
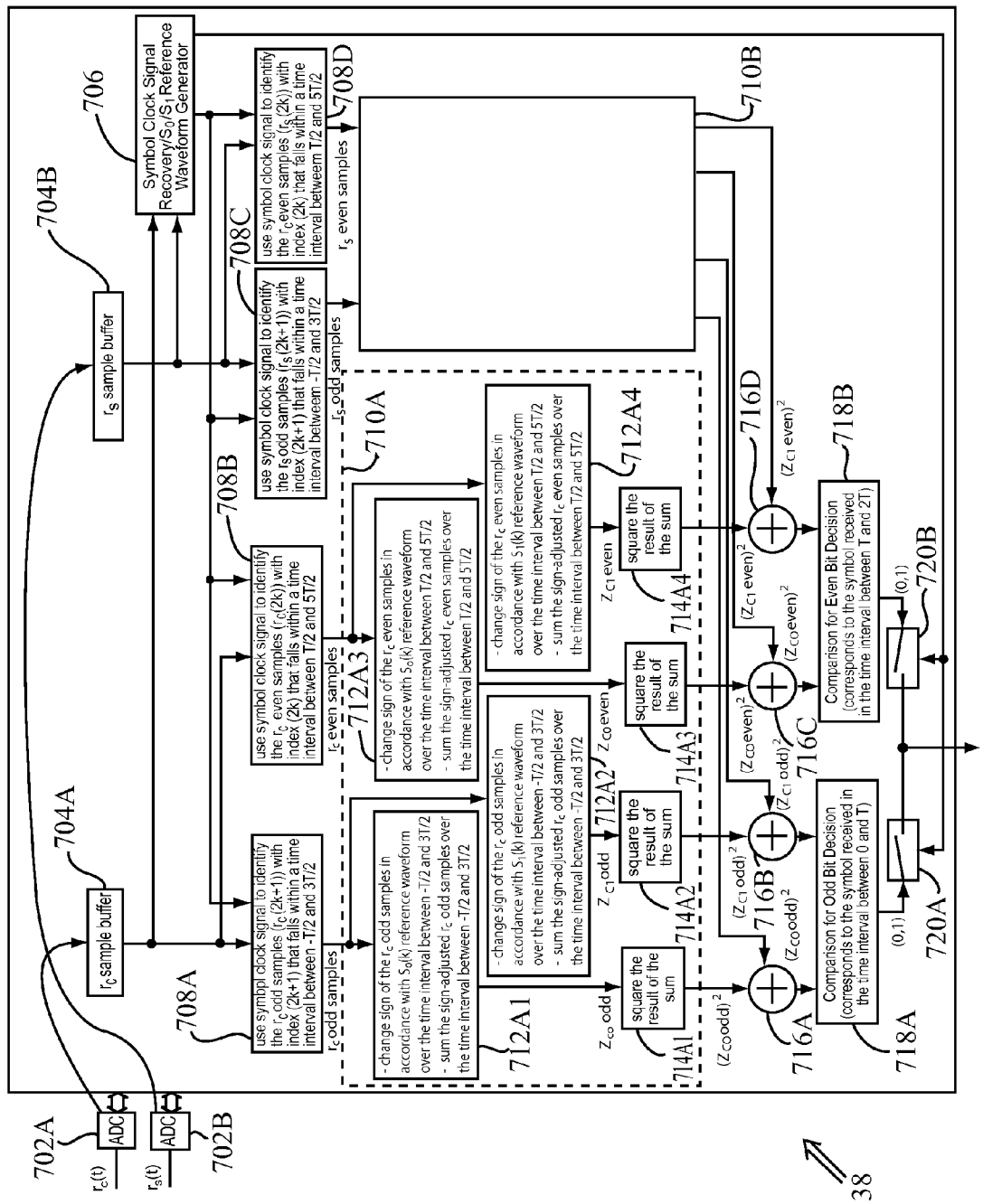
FIG. 8 is a functional block diagram of a digital implementation of the data recovery circuit of FIG. 1 in those instances where FM0-type Tag-to-Interrogator signaling is employed.

FIG. 8 illustrates an exemplary embodiment of a digital implementation of the data recovery circuit 38 for decoding the FM0 waveform and recovering the symbol clock timing of the FM0 waveform according to the invention. The data rate of the FM0 signaling can vary between 40 kbps and 640 kbps. This data rate is selected by the Interrogator 12 by the length of the TR calibration waveform (FIG. 5A) and a predetermined bit (i.e., the DR bit) in the Query command communicated from the Interrogator 12 to the Tag 14. The implementation includes analog-to-digital conversion circuitry (blocks 702A, 702B) that sample the $r_c(t)$ and $r_s(t)$ signals preferably at more than twice the Nyquist frequency (i.e., more than twice the data rate of the FM0 signaling, which can vary between 40 kbps and 640 kbps). In the preferred embodiment, the $r_c(t)$ and $r_s(t)$ signals are sampled at a sampling rate that is at least eight times the data rate of the FM0 signaling. The in-phase samples and the quadrature phase samples, which are each represented by a binary NRZ value {1, −1}, are stored in sample buffers 704A and 704B, respectively. The in-phase samples and the quadrature phase samples are supplied to a symbol clock recovery block 706 that processes the time-sequential samples to generate a symbol clock signal that is substantially synchronous to the transitions between symbols in the FM0 waveform. Thus, the symbol clock signal has a rate that corresponds to the data rate of the FM0 waveform. Such symbol clock recovery can be accomplished in many different ways well known in the communications arts. More particularly, preamble processing is employed for initial synchronization (including signal parameter estimation and symbol timing). Typically, a conventional correlation algorithm (or a simple zero-crossing algorithm) provides precise estimation of symbol timing. During data transmission, one or more synchronization tracking algorithms may be used for timing adjustment. These algorithms are typically based on closed-looped estimators that employ narrow-bandwidth filtration. Details of these symbol synchronization mechanisms is described in detail in Proakis, "Digital Communications", McGraw-Hill, 2000, Section 6.3, herein incorporated by reference in its entirety.

The symbol stream encoded in the FM0 waveform can be logically partitioned into a sequence of odd/even symbol pairs. The even symbols correspond to particular in-phase samples $r_c(2k)$ of the $r_c$ sample buffer and also correspond to particular quadrature phase samples $r_s(2k)$ of the $r_s$ sample buffer, where k is an integer sequence 0, 1, 2, 3, .... The odd symbols correspond to the particular in-phase samples $r_c(2k+1)$ of the $r_c$ sample buffer and also correspond to particular quadrature phase samples $r_s(2k+1)$ of the $r_s$ sample buffer. In the preferred embodiment where the $r_c(t)$ and $r_s(t)$ signals are sampled at eight times the data rate of the FM0 signaling, each odd symbol corresponds to eight successive in-phase samples and eight successive quadrature phase samples, while each even symbol corresponds to the next eight successive in-phase samples and the next eight successive quadrature phase samples. For each odd/even symbol pair, the odd symbol occurs within a time interval between 0 and T and the even symbol occurs within a time interval between T and 2T. The duration of these time intervals is inversely proportional to the data rate of the FM0 waveform, which is selected by downlink communication from the Interrogator 12 to the Tag 14.

The symbol clock signal generated by the symbol clock recovery block 706 is used in eight signal processing paths that operate to decode an odd/even symbol pair in parallel. Four of the eight paths process the in-phase samples (block 710A) while the other four paths process the quadrature phase samples (block 710B).

The four paths that process the in-phase samples (block 710A) can be logically divided into two groups with two paths per group. In accord with the invention, one group operates on in-phase samples that fall within an extended processing window corresponding to the −T/2 to 3T/2 time interval for the odd symbol of the pair (blocks 712A1 and 712A2). The other group operates on in-phase samples that fall within an extended processing window corresponding to the T/2 to 5T/2 time interval for the even symbol of the pair (blocks 712A3 and 712A4).

Similarly, the four paths that process the quadrature phase samples $r_s(k)$ (block 710B) can be logically divided into two groups with two paths per group. One group (not shown) operates on quadrature phase samples that fall within an extended processing window corresponding to the −T/2 to 3T/2 time interval for the odd symbol of the pair. The other group (not shown) operates on quadrature phase samples that fall within an extended processing window corresponding to the T/2 and 5T/2 time interval for the even symbol of the pair.

In the first path (blocks 712A1 and 714A1), the in-phase samples that fall within the −T/2 to 3T/2 processing window are samplewise multiplied by an $S_0$-odd reference waveform. In the digital domain (block 712A1), these operations are carried out by changing the sign of the in-phase samples in accordance with the value of the corresponding part of the $S_0$—odd reference waveform (FIG. 9B) as follows:

| Sample | Reference Waveform | Sign-adjusted Sample |
|---|---|---|
| −1 | −1 | 1 (Sign Flips) |
| −1 | 1 | −1 (No Change) |
| 1 | −1 | −1 (Sign Flips) |
| 1 | 1 | 1 (No Change) |

The results of the samplewise multiplication are accumulated. In the digital domain, this operation is carried out by summing the sign-adjusted in-phase samples over the −T/2 to 3T/2 processing window. The result of the accumulation denoted $Z_{c0}$ odd is then squared in block 714A1. Alternatively, the absolute value of the accumulation result $Z_{c0}$ odd may be calculated in block 714A1.

Figure 10B:
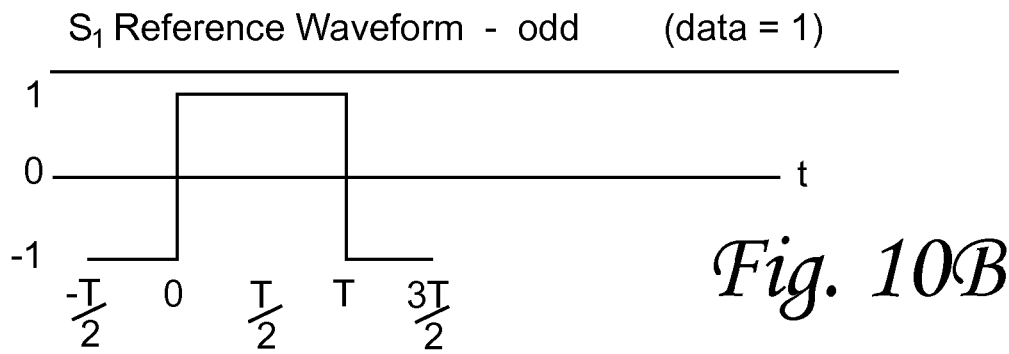
FIG. 10B is a pictorial illustration of an $S_1$—odd reference waveform, which corresponds to the data=1 symbol of the FM0 signal format and which is used for decoding of odd symbols in the data recovery circuit of FIG. 8.

In the second path (blocks 712A2 and 714A2), the in-phase samples that fall within the −T/2 to 3T/2 processing window are samplewise multiplied by an $S_1$-odd reference waveform (FIG. 10B). In the digital domain (block 712A2), these operations are carried out by changing the sign of the in-phase samples in accordance with the value of the corresponding part of the $S_1$—odd reference waveform as set forth above. The results of the samplewise multiplication are accumulated. In the digital domain, this operation is carried out by summing the sign-adjusted in-phase samples over the −T/2 to 3T/2 processing window. The result of the accumulation denoted $Z_{c1}$ odd is then squared in block 714A2. Alternatively, the absolute value of the accumulation result $Z_{c1}$ odd may be calculated in block 714A2.

Figure 9B:
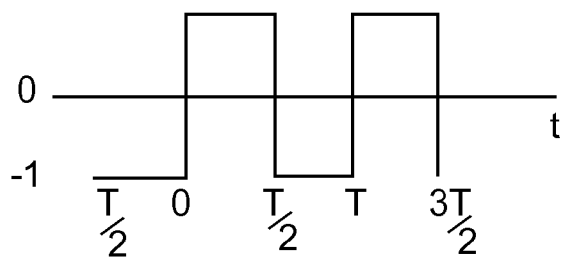
FIG. 9B is a pictorial illustration of an $S_0$—odd reference waveform, which corresponds to the data=0 symbol of the FM0 signal format and which is used for decoding of odd symbols in the data recovery circuit of FIG. 8.
Figure 9C:
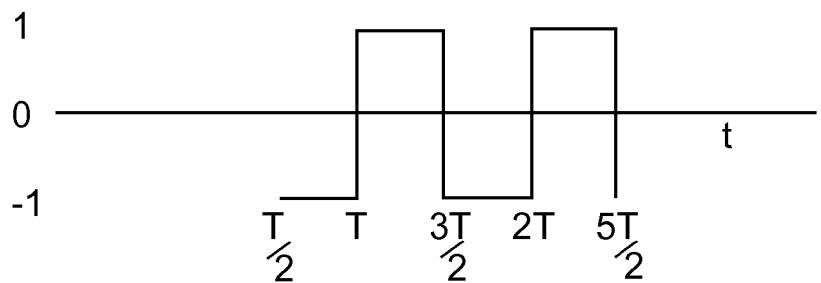
FIG. 9C is a pictorial illustration of an $S_0$—even reference waveform, which corresponds to the data=0 symbol of the FM0 signal format and which is used for decoding of even symbols in the data recovery circuit of FIG. 8.

In the third path (blocks 712A3 and 714A3), the in-phase samples that fall within the T/2 to 5T/2 processing window are samplewise multiplied by the $S_0$—even reference waveform (FIG. 9C). In the digital domain (block 712A3), these operations are carried out by changing the sign of the in-phase samples in accordance with the value of the corresponding part of the $S_0$—even reference waveform as set forth above. The results of the samplewise multiplication are accumulated. In the digital domain, this operation is carried out by summing the sign-adjusted in-phase samples over the T/2 to 5T/2 processing window. The result of the accumulation denoted $Z_{c0}$ even is then squared in block 714A3. Alternatively, the absolute value of the accumulation result $Z_{c0}$ even may be calculated in block 714A3.

Figure 10C:
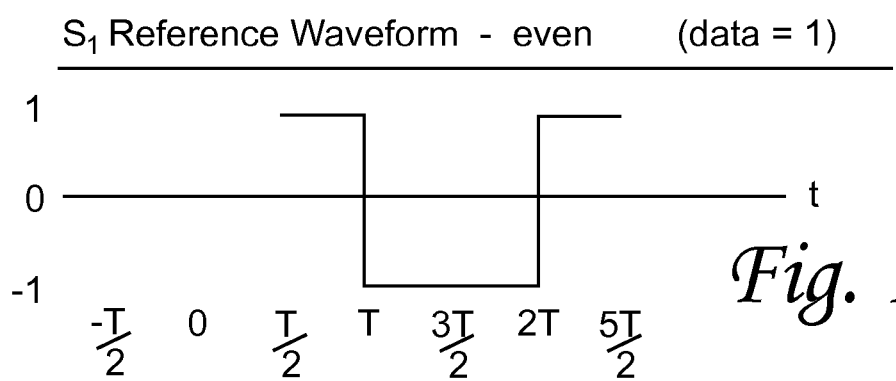
FIG. 10C is a pictorial illustration of an $S_1$—even reference waveform, which corresponds to the data=1 symbol of the FM0 signal format and which is used for decoding of even symbols in the data recovery circuit of FIG. 8.

In the fourth path (blocks 712A4 and 714A4), the in-phase samples that fall within the T/2 to 5T/2 processing window are samplewise multiplied by an $S_1$—even reference waveform (FIG. 10C). In the digital domain (block 712A4), these operations are carried out by changing the sign of the in-phase samples in accordance with the value of the corresponding part of the $S_1$—even reference waveform as set forth above. The results of the samplewise multiplication are accumulated. In the digital domain, this operation is carried out by summing the sign-adjusted in-phase samples over the T/2 to 5T/2 processing window. The result of the accumulation denoted $Z_{c1}$ even is then squared in block 714A4. Alternatively, the absolute value of the accumulation result $Z_{c1}$ even may be calculated in block 714A4.

In block 710B, the operations of blocks 712A1 to 714A4 as described above are performed on corresponding quadrature samples to thereby realize the other four processing paths.

Figure 9A:
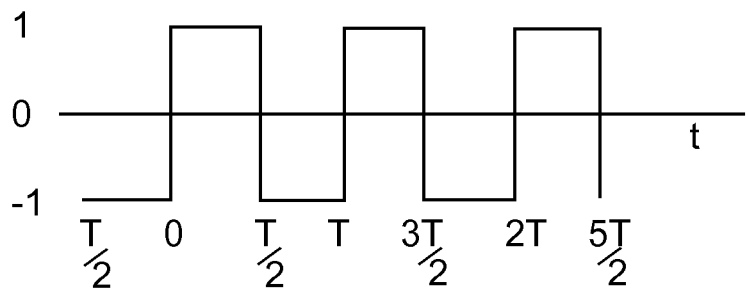
FIG. 9A is a pictorial illustration of a composite $S_0$ reference waveform, which is the composite of the $S_0$—odd reference waveform of FIG. 9B and the $S_0$—even reference waveform of FIG. 9C.

The $S_0$—odd reference waveform (which is a window of the composite $S_0$ reference waveform shown in FIG. 9A) is shown in FIG. 9B. Note that the $S_0$—odd reference waveform is a square wave that corresponds to the FM0 data-0 symbol of FIG. 3A1 over the time interval between 0 and T with a phase inversion for the interval 0 to −T/2 and a phase inversion in the interval from T to 3T/2. In this manner, the $S_0$—odd reference waveform maintains the FM0 signaling rule that a phase inversion occur at the symbol boundaries.

The $S_0$—even reference waveform (which is a different window of the composite $S_0$ reference waveform) is shown in FIG. 9C. Note that the $S_0$—even reference waveform is a square wave that corresponds to the FM0 data-0 symbol of FIG. 3A1 over the time interval between T and 2T with a phase inversion for the interval T to T/2 and a phase inversion in the interval from 2T to 5T/2. In this manner, the $S_0$—even reference waveform maintains the FM0 signaling rule that a phase inversion occur at the symbol boundaries.

FIG. 9A shows the composite $S_0$ reference waveform for FM0 signaling, which is the composite of the $S_0$—odd reference waveform (FIG. 9B) and the $S_0$—even reference waveform (FIG. 9C).

Figure 10A:
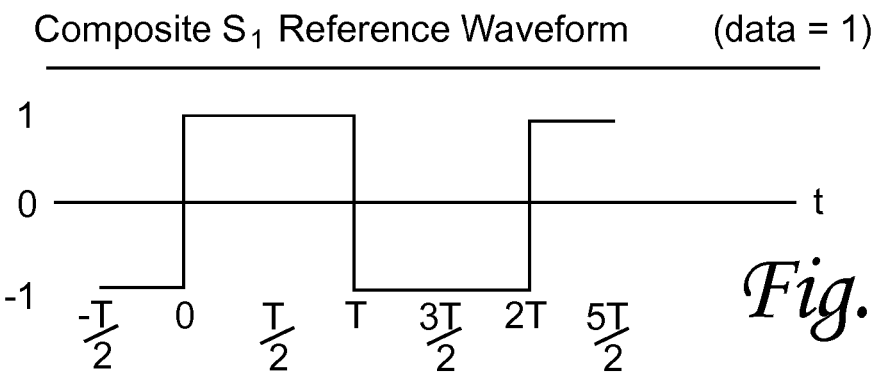
FIG. 10A is a pictorial illustration of a composite $S_1$ reference waveform, which is the composite of the $S_1$—odd reference waveform of FIG. 10B and the $S_1$—even reference waveform of FIG. 10C.

The $S_1$—odd reference waveform (which is a window of the composite $S_1$ reference waveform shown in FIG. 10A) is shown in FIG. 10B. Note that the $S_1$—odd reference waveform is a square wave that corresponds to the FM0 data-1 symbol of FIG. 3A2 over the time interval between 0 and T with a phase inversion for the interval 0 to −T/2 and a phase inversion in the interval from T to 3T/2. In this manner, the $S_1$—odd reference waveform maintains the FM0 signaling rule that a phase inversion occur at the symbol boundaries.

The $S_1$—even reference waveform (which is a different window of the composite $S_1$ reference waveform) is shown in FIG. 10C. Note that the $S_1$—even reference waveform is a square wave that corresponds to the FM0 data-1 symbol of FIG. 3A2 over the time interval between T and 2T with a phase inversion for the interval T to T/2 and a phase inversion in the interval from 2T to 5T/2. In this manner, the $S_1$—even reference waveform maintains the FM0 signaling rule that a phase inversion occur at the symbol boundaries.

FIG. 10A shows the composite $S_1$ reference waveform, which is the composite of the $S_1$—odd reference waveform (FIG. 10B) and the $S_1$—even reference waveform (FIG. 10C).

In essence, the samplewise multiplication and accumulation operations carried out in each one of the eight processing paths of blocks 710A and 710B are digital equivalents of a matched filter implementation over a two symbol period (i.e., over a 2T period). The squaring function (or absolute value function) maps the accumulation results of each respective path into positive numbers such the accumulation results can be effectively combined. The outputs of the squaring functions (or absolute value functions) from complementary paths are summed together. In this manner, block 716A sums the squared accumulation results (or the absolute value of such accumulated results) for the $Z_{c0}$ odd processing path (blocks 712A1 and 714A1) and the $Z_{s0}$ odd processing path (not shown) in block 710B, block 716B sums the squared accumulation results (or the absolute value of such accumulation results) for the $Z_{c1}$ odd processing path (blocks 712A2 and 714A2) and the $Z_{s1}$ odd processing path (not shown) in block 710B, block 716C sums the square accumulation results (or the absolute value of such accumulation results) for the $Z_{c0}$ even processing path (blocks 712A3 and 714A3) and the $Z_{s0}$ even processing path (not shown) in block 710B, and block 716D sums the squared accumulation results (or the absolute value of such accumulation results) for the $Z_{C1}$ even processing path (blocks 712A4 and 714A4) and the $Z_{s1}$ even processing path (not shown) in block 710B.

The output (Z0odd) of adder block 716A and the output (Z1odd) of adder block 716B are supplied to comparison logic 718A that assigns a binary value of 0 or 1 for the odd symbol based thereon. Such assignment is preferably realized by the following comparison operations:

```
if (Z0odd > Z1odd), then the odd symbol
        is assigned to binary value 0;
    else the odd symbol is assigned to binary value 1
endif;
where Z0odd is the output of the adder block 716A and Z1odd is the
output of the adder block 716B.
```

Similarly, the output (Z0even) of adder block 716C and the output (Z1even) of adder block 716D are supplied to comparison logic 718B that assigns a binary value of 0 or 1 for the even symbol based thereon. Such assignment is preferably realized by the following comparison operations:

```
if (Z0even > Z1even), then the even symbol
        is assigned to binary value 0;
    else the even symbol is assigned to binary value 1
endif;
where Z0even is the output of the adder block 716C and Z1even is the
output of the adder block 716D.
```

Controls signals, which are synchronized to the symbol clock timing, are supplied by the symbol clock recovery block 706 to multiplexers 720A, 720B such that odd bit value is output for the odd symbol time period (0 to T) and the even bit value is output for the even symbol time period (T to 2T). In this manner, the output of the multiplexers 720A, 720B provides bit estimates for each odd/even symbol pair in the Tag's Uplink Information Signal 40.

The bit estimates output by the multiplexers 720A, 720B may optionally be loaded into a post-processing block (not shown) that processes the estimates to cancel interference (such as co-channel interference or multi-path interference), an example of which is set forth in US 2004/0014424 to Kristensson et al, herein incorporated by reference in its entirety. Such post-processing may also provide for error correction, which is typically realized by Reed-Solomon decoding or convolutional decoding as part of Viterbi processing.

After data recovery is complete, the bit stream that represents the Tag's Uplink Information Signal 40 is stored in a buffer for communication to the processor 16 for subsequent processing.

The data processing blocks of FIG. 8 are preferably part of a digital signal processing platform 721, which may be realized by a digital signal processor, an FPGA, an ASIC or other suitable data processing means.

FIGS. 11A through 11E illustrate the signal processing operations of the data recovery circuit of FIG. 8.

FIG. 11A illustrates an ideal $r_c(t)$ signal that encodes an odd/even symbol pair {0,1}.

FIG. 11B illustrates the composite $S_0$ reference waveform for FM0-type signaling (FIG. 9A). Samples of the $r_c(t)$ signal that are received within the −T/2 to 3T/2 processing window are samplewise multiplied (e.g., sign changed) by the portion of the composite $S_0$ reference waveform of FIG. 9A for the time interval between −T/2 and 3T/2 (i.e., the $S_0$—odd reference waveform of FIG. 9B) and the results accumulated to generate the $Z_{c0}$odd signal as shown in FIG. 11C. Samples of the $r_c(t)$ signal that are received within the T/2 to 5T/2 processing window are samplewise multiplied (e.g., sign changed) by the portion of the composite $S_0$ reference waveform of FIG. 9A for the time interval between T/2 and 5T/2

(i.e., the $S_0$—even reference waveform of FIG. 9C) and the results accumulated to generate the $Z_{c0}$ even signal as shown in FIG. 11C.

FIG. 11D illustrates the composite $S_1$ reference waveform for FM0-type signaling (FIG. 10A). Samples of the $r_c(t)$ signal that are received within the −T/2 to 3T/2 processing window are samplewise multiplied (e.g., sign changed) by the portion of the composite $S_1$ reference waveform of FIG. 10A for the time interval between −T/2 and 3T/2 (i.e., the $S_1$-odd reference waveform of FIG. 10B) and the results accumulated to generate the $Z_{c1}$ odd signal as shown in FIG. 11E. Samples of the $r_c(t)$ signal that are received within the T/2 to 5T/2 processing window are samplewise multiplied (e.g., sign changed) by the portion of the composite $S_1$ reference waveform of FIG. 10A for the time interval between T/2 and 5T/2 (i.e., the $S_1$—even reference waveform of FIG. 10C) and the results accumulated to generate the $Z_{c1}$ even signal as shown in FIG. 11D.

The signal processing operations of blocks 710A and 710B generate complementary results. In other words, $Z_{s0}$odd corresponds to $Z_{c1}$odd, $Z_{s1}$odd corresponds to $Z_{c0}$odd, $Z_{s0}$even corresponds to $Z_{c1}$even, and $Z_{s1}$even corresponds to $Z_{c0}$even. The signal level of the accumulation results at the end of the respective processing windows (at 3T/2 or 5T/2) are mapped to positive values by squaring (or by absolute value functions) and then summed together in complementary pairs. The result sums are then used as input to the comparison logic for bit level assignment.

Figure 12:
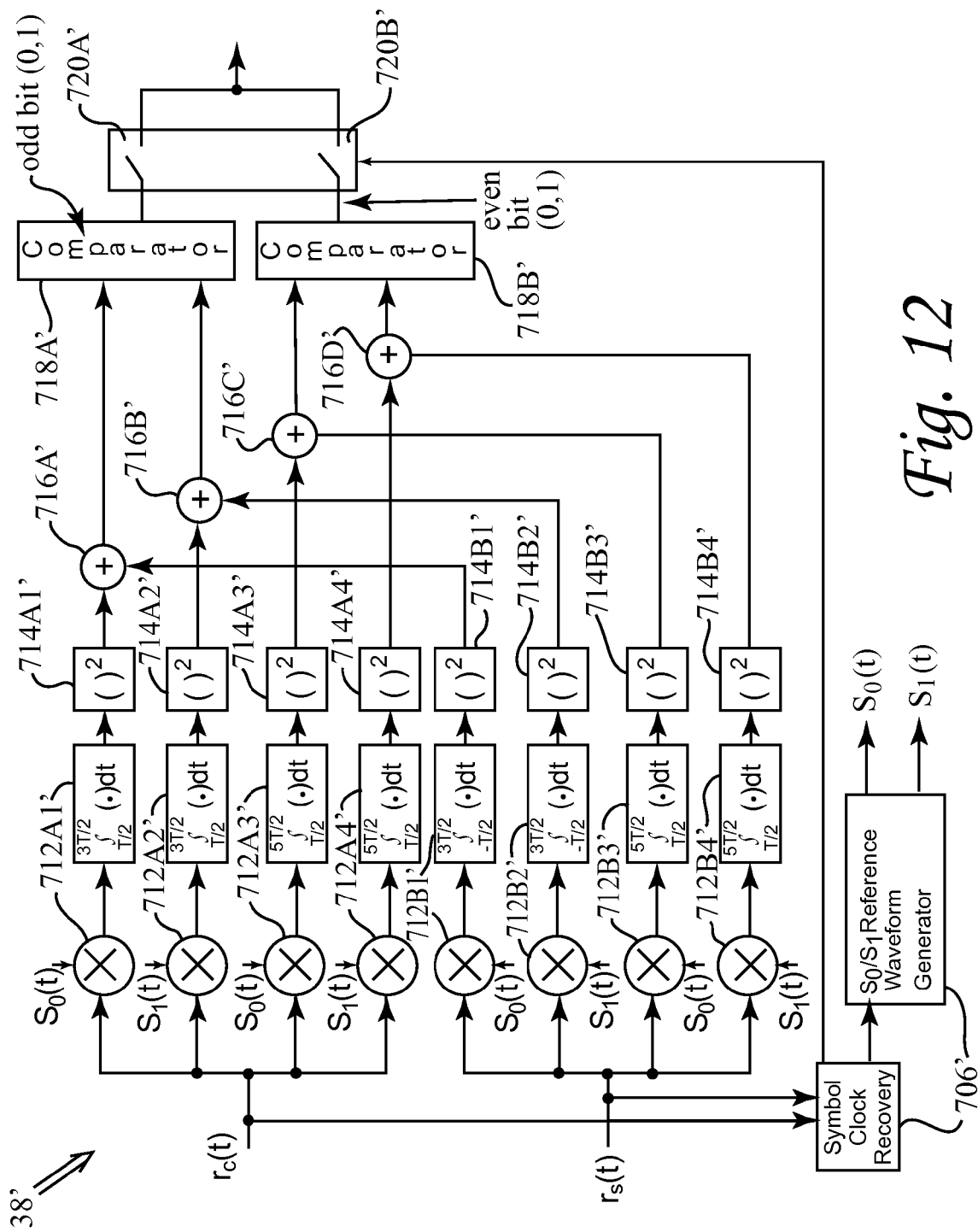
FIG. 12 illustrates an analog implementation of the data recovery circuit of FIG. 8 with like numerals designating analog-forms of the signal processing functionality shown therein.

FIG. 12 illustrates an analog implementation of the data recovery circuit of FIG. 8 with like numerals designating analog-forms of the signal processing functionality described above. Note that in the analog implementation, the samplewise multiplication operations are carried out by analog multipliers and the accumulation operations are carried out by integration circuitry.

Figure 13:
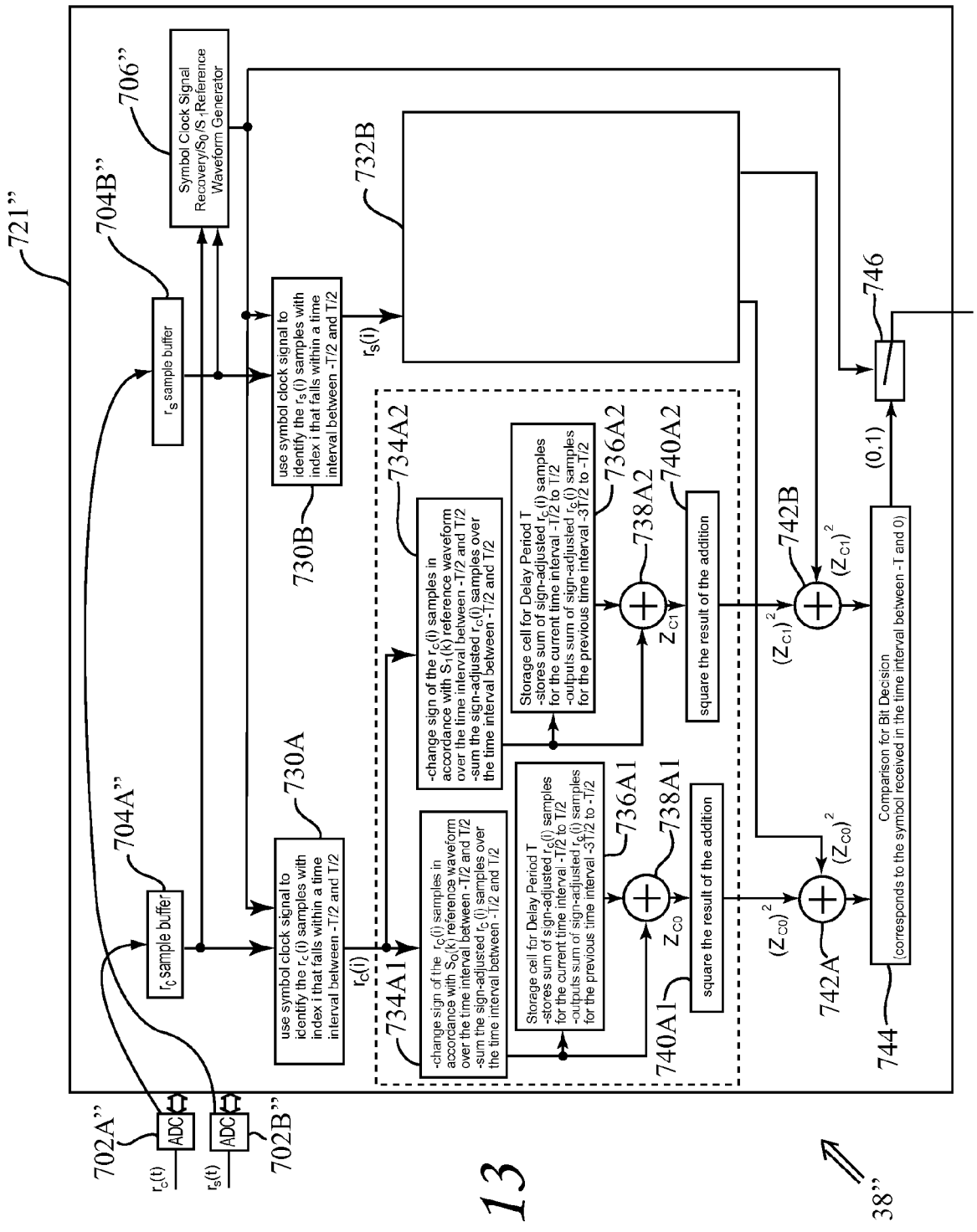
FIG. 13 illustrates an alternate embodiment of the data recovery circuit of FIG. 1 in accordance with the present invention.

FIG. 13 illustrates an alternate digital implementation for the data recovery circuit 38 for decoding the FM0 waveform and recovering the bit clock timing of the FM0 waveform. The implementation includes analog-to-digital conversion circuitry (blocks 702A", 702B") that sample the $r_c(t)$ and $r_s(t)$ signals at preferably more than twice the Nyquist frequency (i.e., more than twice the data rate of the FM0 signaling, which can vary between 40 kbps and 640 kbps). In the preferred embodiment, the $r_c(t)$ and $r_s(t)$ signals are sampled at eight times the data rate of the FM0 signaling. The in-phase samples and the quadrature phase samples, which are each represented by a binary NRZ value {1, −1}, are stored in sample buffers 704A" and 704B", respectively. The in-phase samples and the quadrature phase samples are supplied to a symbol clock recovery block 706" that processes the time-sequential samples to generate a symbol clock signal that is substantially synchronous to the transitions between symbols in the FM0 waveform. Thus, the symbol clock signal has a rate that corresponds to the data rate of the FM0 waveform. Such symbol clock recovery can be accomplished in many different ways well known in the communications arts as described above. The symbol clock signal generated by the symbol clock recovery block 706" is used in four signal processing paths that operate to decode symbols. Two of the four paths process the in-phase samples (block 732A) while the other two paths process the quadrature phase samples (block 732B).

In the first path of block 732A (blocks 734A1, 736A1, 738A1, 740A1), the in-phase samples that fall within the −T/2 to T/2 processing window are samplewise multiplied by the $S_0$ reference waveform of FIG. 9A. In the digital domain (block 734A1), these operations are carried out by changing the sign of the in-phase samples in accordance with the value of the corresponding part of the $S_0$ reference waveform as follows:

| Sample | Reference Waveform | Sign-adjusted Sample |
| --- | --- | --- |
| −1 | −1 | 1 (Sign Flips) |
| −1 | 1 | −1 (No Change) |
| 1 | −1 | −1 (Sign Flips) |
| 1 | 1 | 1 (No Change) |

The results of the samplewise multiplication are accumulated. In the digital domain, this operation is carried out by summing the sign-adjusted in-phase samples over the −T/2 to T/2 processing window. The result of the accumulation of block 734A1 is stored in a storage cell in block 736A1. The accumulation results written to the storage cell in the previous processing window (the time interval −3T/2 to −T/2) are output and added to the accumulation results for the current processing window (the time interval −T/2 to T/2) in block 738A1. The sum denoted $Z_{c0}$ is then squared in block 740A1. Alternatively, the absolute value of the sum $Z_{c0}$ may be calculated in block 740A1.

In the second path (blocks 734A2, 736A2, 738A2, 740A2), the in-phase samples that fall within the −T/2 to T/2 processing window are samplewise multiplied by the $S_1$ reference waveform of FIG. 10B. In the digital domain (block 734A2), these operations are carried out by changing the sign of the in-phase samples in accordance with the value of the corresponding part of the $S_1$ reference waveform as described above. The results of the samplewise multiplication are accumulated. In the digital domain, this operation is carried out by summing the sign-adjusted in-phase samples over the −T/2 to T/2 processing window. The result of the accumulation of block 734A2 is stored in a storage cell in block 736A2. The accumulation results written to the storage cell in the previous processing window (the time interval −3T/2 to −T/2) are output and added to the accumulation results for the current processing window (the time interval −T/2 to T/2) in block 738A2. The sum denoted $Z_{c1}$ is then squared in block 740A2. Alternatively, the absolute value of the sum $Z_{c1}$ may be calculated in block 740A2.

In block 732B, the operations of blocks 734A1 to 740A2 as described above are performed on corresponding quadrature samples to thereby realize the other two processing paths.

The $S_0$ reference waveform is shown in FIG. 9A. The $S_1$ reference waveform is shown in FIG. 10A. In essence, the multiplication, accumulation and storage cell access operations carried out in each one of the four processing paths of blocks 732A and 732B are digital equivalents of a matched filter implementation over a two symbol period (i.e., over a 2T period) which is dictated by two successive processing windows that extend from −T/2 to 3T/2. The squaring function (or absolute value function) maps the accumulation results of each respective path into positive numbers such the accumulation results can be effectively combined. The outputs of the squaring functions (or absolute value functions) from complementary paths are summed together. In this manner, block 742A sums the squared accumulation results (or the absolute value of such accumulated results) for the $Z_{c0}$ processing path (blocks 734A1, 736A1, 738A1, 740A1) and the $Z_{s0}$ processing path (not shown) in block 732B, and block 742B sums the squared accumulation results (or the absolute value of such accumulation results) for the $Z_{c1}$ processing path (blocks 734A2, 736A2, 738A2, 740A2) and the $Z_{s1}$ processing path (not shown) in block 732B.

The output (Z0) of adder block 742A and the output (Z1) of adder block 742B are supplied to comparison logic 744 that assigns a binary value of 0 or 1 for the current symbol based thereon. Such assignment is preferably realized by the following comparison operations:

--- if (Z0 > Z1), then the current symbol
   is assigned to binary value 0;
     else the current symbol is assigned to binary value 1
endif;
where Z0 is the output of the adder block 742A and Z1 is the output of the adder block 742B.

---

Controls signals, which are synchronized to the symbol clock timing, are supplied by the symbol clock recovery block 706" to multiplexer 746 such that bit value is output for the current symbol time period (0 to T). Such operations are repeated for successive processing windows. In this manner, the output of the multiplexer 746 provides bit estimates for successive symbols in the Tag's Uplink Information Signal 40.

The bit estimates output by the multiplexer 746 may optionally be loaded into a post-processing block (not shown) that processes the estimates to cancel interference (such as co-channel interference or multi-path interference) as described above.

Figure 14:
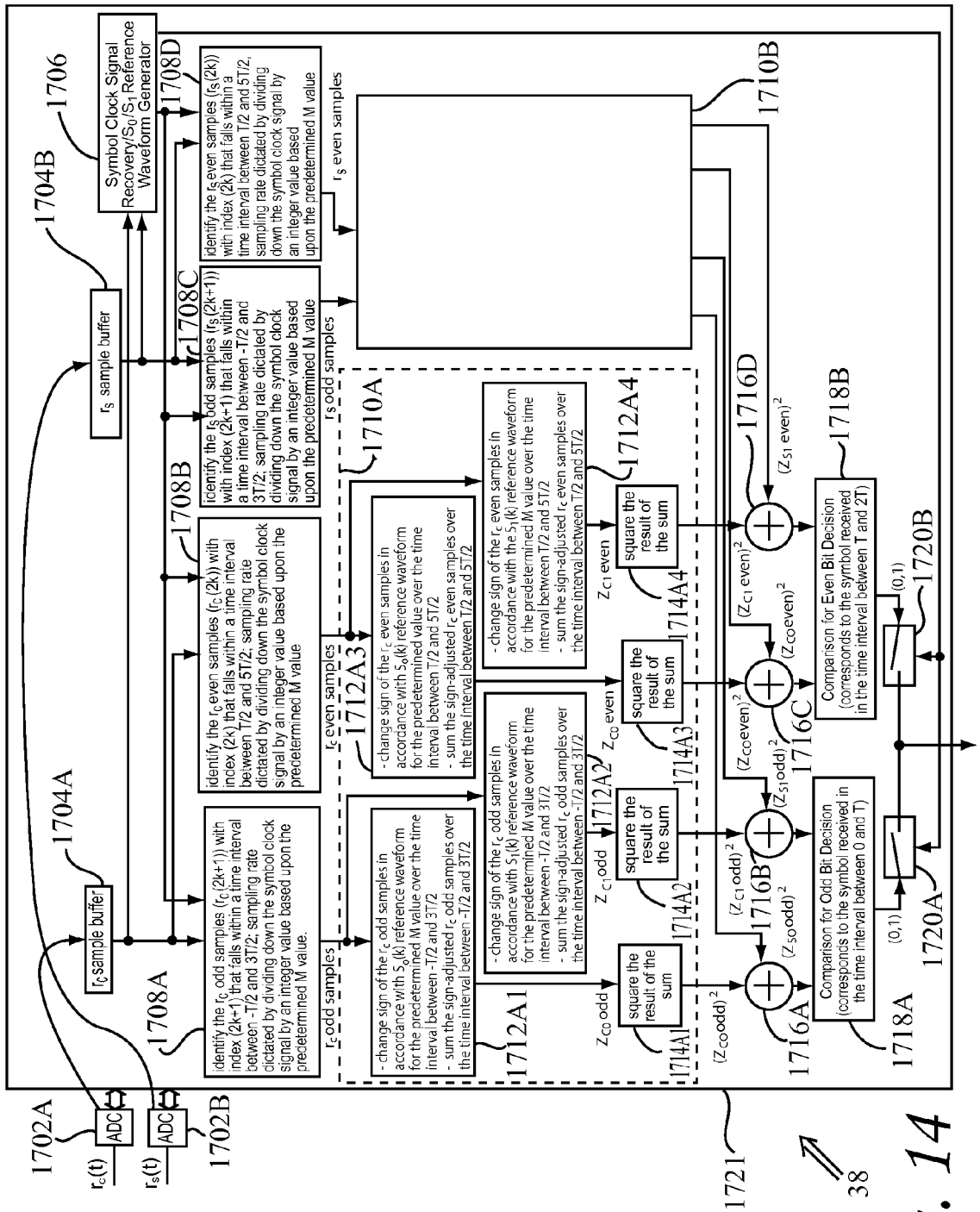
FIG. 14 is a functional block diagram of a digital implementation of the data recovery circuit of FIG. 1 in those instances where Modified-Miller-subcarrier-type Tag-to-Interrogator signaling is employed.

FIG. 14 illustrates an exemplary embodiment of a digital implementation of the data recovery circuit 38 for decoding the Modified-Miller-subcarrier signaling waveforms and recovering the symbol clock timing of the Modified-Miller-subcarrier signaling waveforms according to the invention. The data rate of the Modified-Miller-subcarrier signaling can vary between 5 kbps and 320 kbps. This data rate is selected by the Interrogator 12 by the length of the TR calibration waveform (FIG. 5A) and predetermined bits (i.e., the DR bit and the 2-bit M field) in the Query command communicated from the Interrogator 12 to the Tag 14. The implementation includes analog-to-digital conversion circuitry (blocks 1702A, 1702B) that sample the $r_c(t)$ and $r_s(t)$ signals preferably at more than twice the Nyquist frequency (i.e., more than twice the data rate of the Modified-Miller-subcarrier signaling, which can vary between 5 kbps and 320 kbps). In the preferred embodiment, the $r_c(t)$ and $r_s(t)$ signals are sampled at a sampling rate that is at least eight times the maximum data rate of the Modified-Miller-subcarrier signaling (i.e., eight times the maximum date rate of 320 kbps). Alternatively, the sampling rate can be controlled in accordance with the selected M value (i.e., 2/4/8) such that it is at least eight times the data rate of the selected Modified-Miller-subcarrier signaling scheme. The in-phase samples and the quadrature phase samples, which are each represented by a binary NRZ value {1, −1}, are stored in sample buffers 1704A and 1704B, respectively. The in-phase samples and the quadrature phase samples are supplied to a clock recovery block 1706 that processes the time-sequential samples to generate a subcarrier clock signal that is substantially synchronous to the transitions in the Modified-Miller-subcarrier waveform. Thus, the subcarrier clock signal has a rate that corresponds to the data rate of the Modified-Miller-subcarrier waveform. Such clock recovery operations can be accomplished in many different ways well known in the communications arts. More particularly, preamble processing is employed for initial synchronization (including signal parameter estimation and symbol timing). Typically, a conventional correlation algorithm (or a simple zero-crossing algorithm) provides precise estimation of timing. During data transmission, one or more synchronization tracking algorithms may be used for timing adjustment. These algorithms are typically based on closed-looped estimators that employ narrow-bandwidth filtration. Details of these synchronization mechanisms are described in detail in Proakis, "Digital Communications", McGraw-Hill, 2000, Section 6.3, herein incorporated by reference in its entirety. The symbol clock signal, which is substantially synchronous to symbol transitions in the Modified-Miller-subcarrier waveform, is derived by up-converting the subcarrier clock signal by a factor (i.e., 2, 4, or 8) corresponding to the M value of the selected Modified-Miller-subcarrier signaling scheme.

The symbol stream encoded in the Modified-Miller-subcarrier waveform can be logically partitioned into a sequence of odd/even symbol pairs. The even symbols correspond to particular in-phase samples $r_c(2k)$ of the $r_c$ sample buffer and also correspond to particular quadrature phase samples $r_s(2k)$ of the $r_s$ sample buffer, where k is an integer sequence 0, 1, 2, 3, .... The odd symbols correspond to the particular in-phase samples $r_c(2k-1)$ of the $r_c$ sample buffer and also correspond to particular quadrature phase samples $r_s(2k-1)$ of the $r_s$ sample buffer. For example, where the $r_c(t)$ and $r_s(t)$ signals are sampled at eight times the data rate of the selected Modified-Miller-subcarrier signaling scheme, each odd symbol corresponds to eight successive in-phase samples and eight successive quadrature phase samples, while each even symbol corresponds to the next eight successive in-phase samples and the next eight successive quadrature phase samples. For each odd/even symbol pair, the odd symbol occurs within a time interval between 0 and T and the even symbol occurs within a time interval between T and 2T. The duration of these time intervals is inversely proportional to the data rate of the Modified-Miller-subcarrier waveform, which is selected by downlink communication from the Interrogator 12 to the Tag 14.

The subcarrier clock signal and the symbol clock signal generated by the clock recovery block 1706 is used in eight signal processing paths that operate to decode an odd/even symbol pair in parallel. Four of the eight paths process the in-phase samples (block 1710A) while the other four paths process the quadrature phase samples (block 1710B).

The four paths that process the in-phase samples (block 1710A) can be logically divided into two groups with two paths per group. In accord with the invention, one group operates on in-phase samples that fall within an extended processing window corresponding to the −T/2 to 3T/2 time interval for the odd symbol of the pair (blocks 1712A1 and 1712A2). The other group operates on in-phase samples that fall within an extended processing window corresponding to the T/2 to 5T/2 time interval for the even symbol of the pair (blocks 1712A3 and 1712A4).

Similarly, the four paths that process the quadrature phase samples $r_s(k)$ (block 1710B) can be logically divided into two groups with two paths per group. One group (not shown) operates on quadrature phase samples that fall within an extended processing window corresponding to the −T/2 to 3T/2 time interval for the odd symbol of the pair. The other group (not shown) operates on quadrature phase samples that fall within an extended processing window corresponding to the T/2 and 5T/2 time interval for the even symbol of the pair.

In the first path (blocks 1712A1 and 1714A1), the in-phase samples that fall within the −T/2 to 3T/2 processing window are samplewise multiplied by an $S_0$ reference waveform generated by block 1706. The $S_0$ reference waveform generated by block 1706 varies based upon the M value (e.g., 2, 4 or 8) of the selected Modified-Miller-subcarrier signaling scheme as shown in FIGS. 15C1, 15D1 and 15E1. In the digital domain, the operations of block 1712A1 are carried out by changing the sign of the in-phase samples in accordance with the value of the corresponding part of the $S_0$ reference waveform as follows:

| Sample | Reference Waveform | Sign-adjusted Sample |
|---|---|---|
| −1 | −1 | 1 (Sign Flips) |
| −1 | 1 | −1 (No Change) |
| 1 | −1 | −1 (Sign Flips) |
| 1 | 1 | 1 (No Change) |

The results of the samplewise multiplication are accumulated. In the digital domain, this operation is carried out by summing the sign-adjusted in-phase samples over the −T/2 to 3T/2 processing window. The result of the accumulation denoted $Z_{c0}$ odd is then squared in block 714A1. Alternatively, the absolute value of the accumulation result $Z_{c0}$ odd may be calculated in block 714A1.

In the second path (blocks 1712A2 and 1714A2), the in-phase samples that fall within the −T/2 to 3T/2 processing window are samplewise multiplied by an $S_1$ reference waveform generated by block 1706. The $S_1$ reference waveform generated by block 1706 varies based upon the M value (e.g., 2, 4 or 8) of the selected Modified-Miller-subcarrier signaling scheme as shown in FIGS. 15C2, 15D2 and 15E2. In the digital domain, the operations of block 1712A2 are carried out by changing the sign of the in-phase samples in accordance with the value of the corresponding part of the $S_1$ reference waveform as set forth above. The results of the samplewise multiplication are accumulated. In the digital domain, this operation is carried out by summing the sign-adjusted in-phase samples over the −T/2 to 3T/2 processing window. The result of the accumulation denoted $Z_{c1}$ odd is then squared in block 714A2. Alternatively, the absolute value of the accumulation result $Z_{c1}$ odd may be calculated in block 714A2.

In the third path (blocks 1712A3 and 1714A3), the in-phase samples that fall within the T/2 to 5T/2 processing window are samplewise multiplied by the $S_0$ reference waveform generated by block 1706. In the digital domain, the operations of block 1712A3 are carried out by changing the sign of the in-phase samples in accordance with the value of the corresponding part of the $S_0$ reference waveform as set forth above. Note that the $S_0$ reference waveforms of FIGS. 15C1, 15D1 and 15E1 depict the −T/2 to 3T/2 processing window. The $S_0$ reference waveforms for the T/2 to 5T/2 processing window can be derived by following the waveforms of FIGS. 15C1, 15D1 and 15E1 for the period T/2 to 3T/2 and then wrapping back to include the waveform shown for the period −T/2 to T/2. The results of the samplewise multiplication are accumulated. In the digital domain, this operation is carried out by summing the sign-adjusted in-phase samples over the T/2 to 5T/2 processing window. The result of the accumulation denoted $Z_{c0}$ even is then squared in block 1714A3. Alternatively, the absolute value of the accumulation result $Z_{c0}$ even may be calculated in block 1714A3.

In the fourth path (blocks 1712A4 and 1714A4), the in-phase samples that fall within the T/2 to 5T/2 processing window are samplewise multiplied by the $S_1$ reference waveform generated by block 1706. In the digital domain, the operations of block 1712A4 are carried out by changing the sign of the in-phase samples in accordance with the value of the corresponding part of the $S_1$ reference waveform as set forth above. Note that the $S_1$ reference waveforms of FIGS. 15C2, 15D2 and 15E2 depict the −T/2 to 3T/2 processing window. The $S_1$ reference waveforms for the T/2 to 5T/2 processing window can be derived by following the waveforms of FIGS. 15C2, 15D2 and 15E2 for the period T/2 to 3T/2 and then wrapping back to include the waveform shown for the period −T/2 to T/2. The results of the samplewise multiplication are accumulated. In the digital domain, this operation is carried out by summing the sign-adjusted in-phase samples over the T/2 to 5T/2 processing window. The result of the accumulation denoted $Z_{c1}$ even is then squared in block 1714A4. Alternatively, the absolute value of the accumulation result $Z_{c1}$ even may be calculated in block 1714A4.

In block 1710B, the operations of blocks 1712A1 to 1714A4 as described above are performed on corresponding quadrature samples to thereby realize the other four processing paths.

The $S_0$ reference waveforms generated by block 1706 for the different M values (e.g., 2, 4 or 8) of the Modified-Miller-subcarrier signaling scheme are shown in FIGS. 15C1, 15D1 and 15E1. Each $S_0$ reference waveform is derived by multiplying the $S_0$ basis waveform of FIG. 15A1 by a square wave as shown in FIG. 15B. The $S_0$ basis waveform is equivalent to the symbol clock signal. The square wave is equivalent to the subcarrier clock signal and thus its rate is dependent on the M value of the selected Modified-Miller-subcarrier signaling scheme. Note that the $S_0$ basis waveform corresponds to the data-0 symbol of Modified-Miller baseband signal over the time interval between 0 and T with a phase inversion at the symbol boundaries (0, T). In this manner, the $S_0$ basis waveform maintains the signaling rule that a phase inversion occur at the symbol boundaries.

The S1 reference waveforms generated by block 1706 for the different M values (e.g., 2, 4 or 8) of the Modified-Miller-subcarrier signaling scheme are shown in FIGS. 15C2, 15D2 and 15E2. Each $S_1$ reference waveform is derived by multiplying the $S_1$ basis waveform of FIG. 15A2 by a square wave as shown in FIG. 15B. The $S_0$ basis waveform is equivalent to the symbol clock signal. The square wave is equivalent to the subcarrier clock signal and thus its rate is dependent on the M value of the selected Modified-Miller-subcarrier signaling scheme. Note that the $S_1$ basis waveform corresponds to the data-1 symbol of Modified-Miller baseband signal over the time interval between 0 and T with a phase inversion at the symbol boundaries (0, T). In this manner, the $S_1$ basis waveform maintains the signaling rule that a phase inversion occur at the symbol boundaries.

In essence, the samplewise multiplication and accumulation operations carried out in each one of the eight processing paths of blocks 1710A and 1710B are digital equivalents of a matched filter implementation over a two symbol period (i.e., over a 2T period). The squaring function (or absolute value function) maps the accumulation results of each respective path into positive numbers such the accumulation results can be effectively combined. The outputs of the squaring functions (or absolute value functions) from complementary paths are summed together. In this manner, block 1716A sums the squared accumulation results (or the absolute value of such accumulated results) for the $Z_{c0}$ odd processing path (blocks 1712A1 and 1714A1) and the $Z_{s0}$ odd processing path (not shown) in block 1710B, block 1716B sums the squared accumulation results (or the absolute value of such accumulation results) for the $Z_{c1}$ odd processing path (blocks 1712A2 and 1714A2) and the $Z_{s1}$ odd processing path (not shown) in block 1710B, block 1716C sums the square accumulation results (or the absolute value of such accumulation results) for the $Z_{c0}$ even processing path (blocks 1712A3 and 1714A3) and the $Z_{s0}$ even processing path (not shown) in block 1710B, and block 1716D sums the squared accumulation results (or the absolute value of such accumulation results) for the $Z_{c1}$ even processing path (blocks 1712A4 and 1714A4) and the $Z_{s1}$ even processing path (not shown) in block 1710B.

The output (Z0odd) of adder block 1716A and the output (Z1odd) of adder block 1716B are supplied to comparison logic 1718A that assigns a binary value of 0 or 1 for the odd symbol based thereon. Such assignment is preferably realized by the following comparison operations:

--- if (Z0odd > Z1odd), then the odd symbol
    is assigned to binary value 0;
        else the odd symbol is assigned to binary value 1
endif;
where Z0odd is the output of the adder block 1716A and Z1odd is the output of the adder block 1716B.

---

Similarly, the output (Z0even) of adder block 1716C and the output (Z1even) of adder block 1716D are supplied to comparison logic 1718B that assigns a binary value of 0 or 1 for the even symbol based thereon. Such assignment is preferably realized by the following comparison operations:

--- if (Z0even > Z1even), then the even symbol
    is assigned to binary value 0;
        else the even symbol is assigned to binary value 1
endif;
where Z0even is the output of the adder block 1716C and Z1even is the output of the adder block 1716D.

---

Controls signals, which are synchronized to the symbol clock timing, are supplied by the clock recovery block 1706 to multiplexers 1720A, 1720B such that odd bit value is output for the odd symbol time period (0 to T) and the even bit value is output for the even symbol time period (T to 2T). In this manner, the output of the multiplexers 1720A, 1720B provides bit estimates for each odd/even symbol pair in the Tag's Uplink Information Signal 40.

The bit estimates output by the multiplexers 1720A, 1720B may optionally be loaded into a post-processing block (not shown) that processes the estimates to cancel interference (such as co-channel interference or multi-path interference), an example of which is set forth in US 2004/0014424 to Kristensson et al, herein incorporated by reference in its entirety. Such post-processing may also provide for error correction, which is typically realized by Reed-Solomon decoding or convolutional decoding as part of Viterbi processing.

After data recovery is complete, the bit stream that represents the Tag's Uplink Information Signal 40 is stored in a buffer for communication to the processor 16 for subsequent processing.

The data processing blocks of FIG. 14 are preferably part of a digital signal processing platform 1721, which may be realized by a digital signal processor, an FPGA, an ASIC or other suitable data processing means.

FIGS. 16A1 through 16A5 illustrate the signal processing operations of the data recovery circuit of FIG. 14 for the particular symbol sequence {0,0,x}, where x represents a don't care symbol (i.e., either a data-0 symbol or a data-1 symbol). These signal processing operations recover the "0" bit value for the middle odd symbol of the sequence. Similar processing operations are performed to recover the bit values of the preceding and subsequent even symbols.

FIG. 16A1 illustrates an ideal $r_c(t)$ signal utilizing the M=2 Modified-Miller-subcarrier signaling scheme that encodes the symbol sequence {0,0,x}.

FIG. 16A2 illustrates the $S_0$ reference waveform for the M=2 Modified-Miller-subcarrier signaling scheme (FIG. 15C1). Samples of the $r_c(t)$ signal that are received within the −T/2 to 3T/2 processing window are samplewise multiplied (e.g., sign changed) by the corresponding portion of the $S_0$ reference waveform for the time interval between −T/2 and 3T/2 and the results accumulated to generate the $Z_{c0}$ signal as shown in FIG. 16A3.

FIG. 16A4 illustrates the $S_1$ reference waveform for the M=2 Modified-Miller-subcarrier signaling scheme (FIG. 15C2). Samples of the $r_c(t)$ signal that are received within the −T/2 to 3T/2 processing window are samplewise multiplied (e.g., sign changed) by the corresponding portion of the $S_1$ reference waveform for the time interval between −T/2 and 3T/2 and the results accumulated to generate the $Z_{c1}$ signal as shown in FIG. 16A5.

Similar operations are performed on samples of the quadrature $r_s(t)$ signal that are received within the −T/2 to 3T/2 processing window. These signal processing operations (blocks 1710A and 1710B) generate complementary results. In other words, $Z_{c0}$ corresponds to $Z_{s1}$ and $Z_{c1}$ corresponds to $Z_{s0}$. The signal level of the accumulation results at the end of the processing window (at 3T/2) are mapped to positive values by squaring (or by absolute value functions) and then summed together in pairs. The result sums are then used as input to the comparison logic for bit level assignment, which recovers the "0" bit level for the middle data-0 symbol in the {0,0,x} symbol sequence.

FIGS. 16B1 through 16B5 illustrate the signal processing operations of the data recovery circuit of FIG. 14 for the particular symbol sequence {1,0x}, where x represents a don't care symbol (i.e., either a data-0 symbol or a data-1 symbol). These signal processing operations recover the "0" bit value for the middle odd symbol of the sequence. Similar processing operations are performed to recover the bit values of the preceding and subsequent even symbols.

FIG. 16B1 illustrates an ideal $r_c(t)$ signal utilizing the M=2 Modified-Miller-subcarrier signaling scheme that encodes the symbol sequence {1,0,x}.

FIG. 16B2 illustrates the $S_0$ reference waveform for the M=2 Modified-Miller-subcarrier signaling scheme (FIG. 15C1). Samples of the $r_c(t)$ signal that are received within the −T/2 to 3T/2 processing window are samplewise multiplied (e.g., sign changed) by the corresponding portion of the $S_0$ reference waveform for the time interval between −T/2 and 3T/2 and the results accumulated to generate the $Z_{c0}$ signal as shown in FIG. 16B3.

FIG. 16B4 illustrates the $S_1$ reference waveform for the M=2 Modified-Miller-subcarrier signaling scheme (FIG. 15C2). Samples of the $r_c(t)$ signal that are received within the −T/2 to 3T/2 processing window are samplewise multiplied (e.g., sign changed) by the corresponding portion of the $S_1$ reference waveform for the time interval between −T/2 and 3T/2 and the results accumulated to generate the $Z_{c1}$ signal as shown in FIG. 16B5.

Similar operations are performed on samples of the quadrature $r_s(t)$ signal that are received within the −T/2 to 3T/2 processing window. These signal processing operations (blocks 1710A and 1710B) generate complementary results. In other words, $Z_{c0}$ corresponds to $Z_{s1}$ and $Z_{c1}$ corresponds to $Z_{s0}$. The signal level of the accumulation results at the end of the processing window (at 3T/2) are mapped to positive values by squaring (or by absolute value functions) and then summed together in pairs. The result sums are then used as input to the comparison logic for bit level assignment, which recovers the "0" bit level for the middle data-0 symbol in the {1,0,x} symbol sequence.

FIGS. 16C1 through 16C5 illustrate the signal processing operations of the data recovery circuit of FIG. 14 for the particular symbol sequence {0,1,x} where x represents a don't care symbol (i.e., either a data-0 symbol or a data-1 symbol). These signal processing operations recover the "1" bit value for the middle odd symbol of the sequence. Similar processing operations are performed to recover the bit values of the preceding and subsequent even symbols.

FIG. 16C1 illustrates an ideal $r_c(t)$ signal utilizing the M=2 Modified-Miller-subcarrier signaling scheme that encodes the symbol sequence {0,1,x}.

FIG. 16A2 illustrates the $S_0$ reference waveform for the M=2 Modified-Miller-subcarrier signaling scheme (FIG. 15C1). Samples of the $r_c(t)$ signal that are received within the −T/2 to 3T/2 processing window are samplewise multiplied (e.g., sign changed) by the corresponding portion of the $S_0$ reference waveform for the time interval between −T/2 and 3T/2 and the results accumulated to generate the $Z_{c0}$ signal as shown in FIG. 16C3.

FIG. 16C4 illustrates the $S_1$ reference waveform for the M=2 Modified-Miller-subcarrier signaling scheme (FIG. 15C2). Samples of the $r_c(t)$ signal that are received within the −T/2 to 3T/2 processing window are samplewise multiplied (e.g., sign changed) by the corresponding portion of the $S_1$ reference waveform for the time interval between −T/2 and 3T/2 and the results accumulated to generate the $Z_{c1}$ signal as shown in FIG. 16C5.

Similar operations are performed on samples of the quadrature $r_s(t)$ signal that are received within the −T/2 to 3T/2 processing window. These signal processing operations (blocks 1710A and 1710B) generate complementary results. In other words, $Z_{c0}$ corresponds to $Z_{s1}$ and $Z_{c1}$ corresponds to $Z_{s0}$. The signal level of the accumulation results at the end of the processing window (at 3T/2) are mapped to positive values by squaring (or by absolute value functions) and then summed together in pairs. The result sums are then used as input to the comparison logic for bit level assignment, which recovers the "1" bit level for the middle data-1 symbol in the {0,1,x} sequence.

FIGS. 16D1 through 16D5 illustrate the signal processing operations of the data recovery circuit of FIG. 14 for the particular symbol sequence {1,1x} where x represents a don't care symbol (i.e., either a data-0 symbol or a data-1 symbol). These signal processing operations recover the "1" bit value for the middle odd symbol of the sequence. Similar processing operations are performed to recover the bit values of the preceding and subsequent even symbols.

FIG. 16D1 illustrates an ideal $r_c(t)$ signal utilizing the M=2 Modified-Miller-subcarrier signaling scheme that encodes the symbol sequence {1,1x}.

FIG. 16D2 illustrates the $S_0$ reference waveform for the M=2 Modified-Miller-subcarrier signaling scheme (FIG. 15C1). Samples of the $r_c(t)$ signal that are received within the −T/2 to 3T/2 processing window are samplewise multiplied (e.g., sign changed) by the corresponding portion of the $S_0$ reference waveform for the time interval between −T/2 and 3T/2 and the results accumulated to generate the $Z_{c0}$ signal as shown in FIG. 16D3.

FIG. 16D4 illustrates the $S_1$ reference waveform for the M=2 Modified-Miller-subcarrier signaling scheme (FIG. 15C2). Samples of the $r_c(t)$ signal that are received within the −T/2 to 3T/2 processing window are samplewise multiplied (e.g., sign changed) by the corresponding portion of the $S_1$ reference waveform for the time interval between −T/2 and 3T/2 and the results accumulated to generate the $Z_{c1}$ signal as shown in FIG. 16D5.

Similar operations are performed on samples of the quadrature $r_s(t)$ signal that are received within the −T/2 to 3T/2 processing window. These signal processing operations (blocks 1710A and 1710B) generate complementary results. In other words, $Z_{c0}$ corresponds to $Z_{s1}$ and $Z_{c1}$ corresponds to $Z_{s0}$. The signal level of the accumulation results at the end of the processing window (at 3T/2) are mapped to positive values by squaring (or by absolute value functions) and then summed together in pairs. The result sums are then used as input to the comparison logic for bit level assignment, which recovers the "1" bit level for the middle data-1 symbol in the {1,1,x} sequence.

In order to recover the bit value of the subsequent even symbol, similar processing operations are performed over samples of the $r_c(t)$ signal and $r_s(t)$ signal that are received within the subsequent T/2 to 5T/2 processing window. The signal level of the accumulation results at the end of the processing window (at 5T/2) are mapped to positive values by squaring (or by absolute value functions) and then summed together in pairs. The result sums are then used as input to the comparison logic for bit level assignment of the subsequent even symbol. In order to recover the bit value of the preceding even symbol, similar processing operations are performed over samples of the $r_c(t)$ signal and $r_s(t)$ signal that are received within the preceding −5T/2 to −T/2 processing window.

Figure 17:
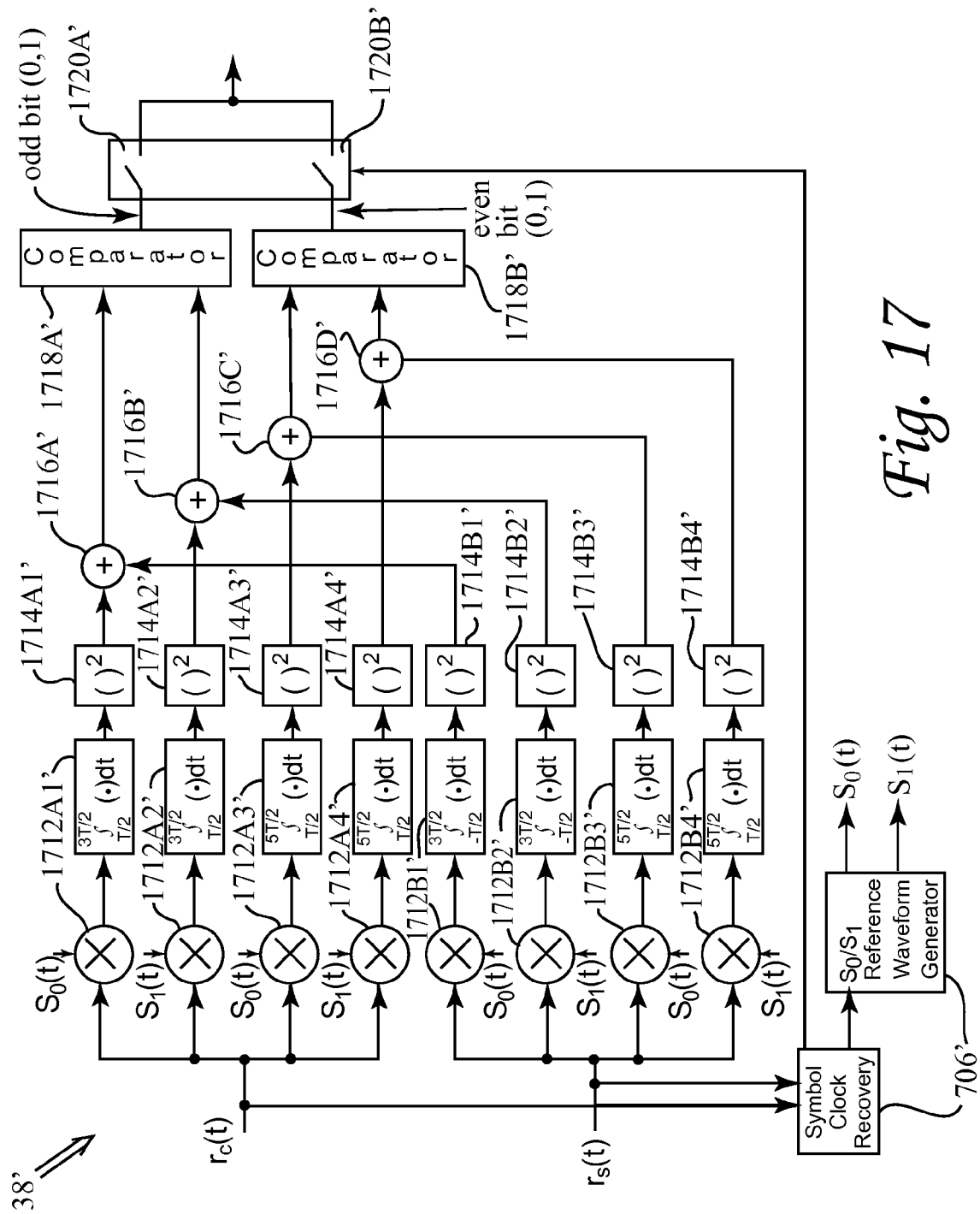
FIG. 17 illustrates an analog implementation of the data recovery circuit of FIG. 14 with like numerals designating analog-forms of the signal processing functionality shown therein.

FIG. 17 illustrates an analog implementation of the data recovery circuit of FIG. 14 with like numerals designating analog-forms of the signal processing functionality described above. Note that in the analog implementation, the samplewise multiplication operations are carried out by analog multipliers and the accumulation operations are carried out by integration circuitry.

Figure 18:
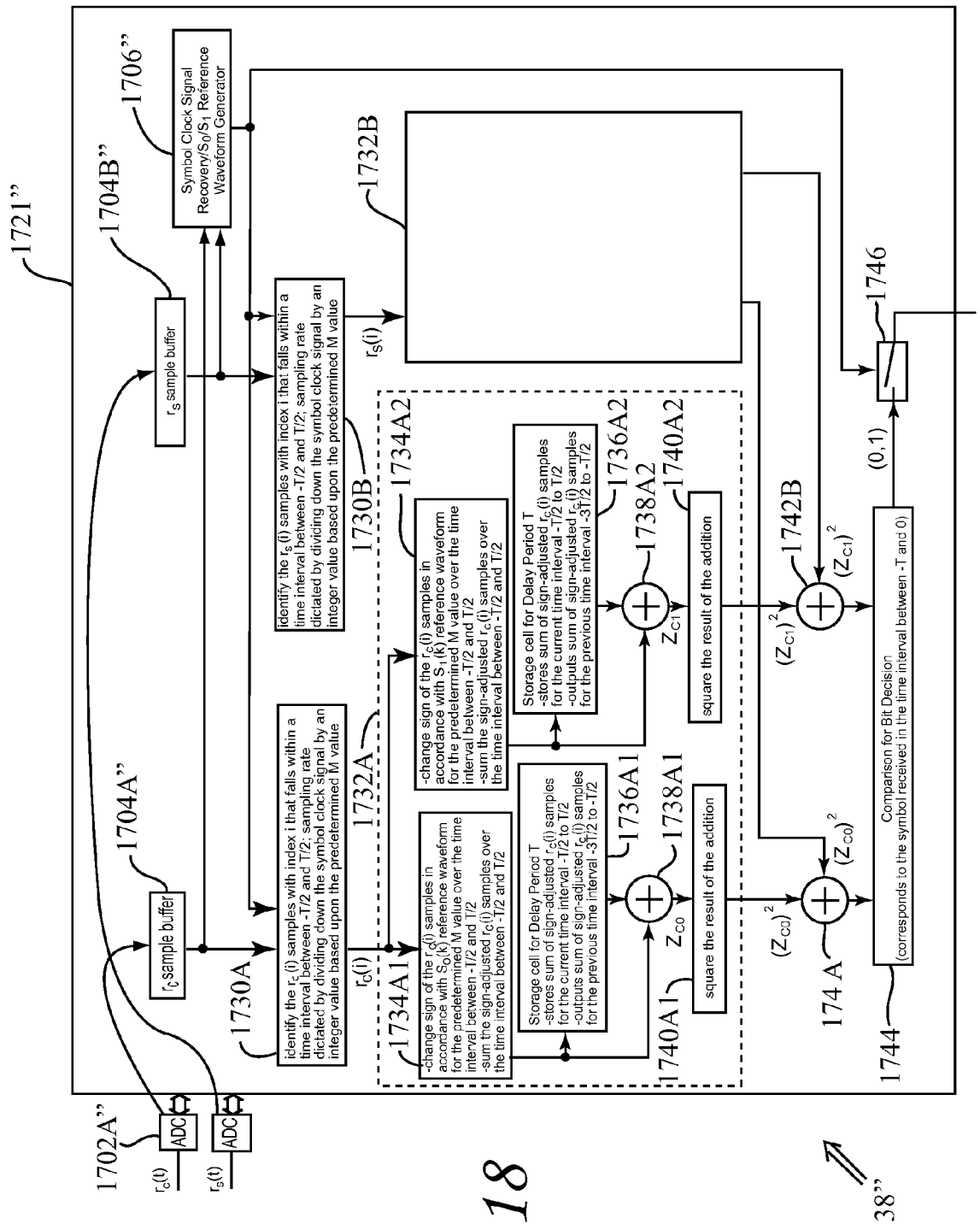
FIG. 18 illustrates an alternate embodiment of the data recovery circuit of FIG. 14 in accordance with the present invention.

FIG. 18 illustrates an alternate digital implementation for the data recovery circuit 38 for decoding the Modified-Miller-subcarrier waveform and recovering the symbol clock timing of the Modified-Miller-subcarrier waveform according to the invention. The data rate of the Modified-Miller-subcarrier signaling can vary between 5 kbps and 320 kbps. This data rate is selected by the Interrogator 12 by the length of the TR calibration waveform (FIG. 5A) and predetermined bits (i.e., the DR bit and the 2-bit M field) in the Query command communicated from the Interrogator 12 to the Tag 14. The implementation includes analog-to-digital conversion circuitry (blocks 1702A", 1702B") that sample the $r_c(t)$ and $r_s(t)$ signals preferably at more than twice the Nyquist frequency (i.e., more than twice the data rate of the Modified-Miller-subcarrier signaling, which can vary between 5 kbps and 320 kbps). In the preferred embodiment, the $r_c(t)$ and $r_s(t)$ signals are sampled at a sampling rate that is at least eight times the maximum data rate of the Modified-Miller-subcarrier signaling (i.e., eight times the maximum date rate of 320 kbps). Alternatively, the sampling rate can be controlled in accordance with the selected M value (i.e., 2, 4, or 8) such that it is at least eight times the data rate of the selected Modified-Miller-subcarrier signaling scheme. The in-phase samples and the quadrature phase samples, which are each represented by a binary NRZ value {1, −1}, are stored in sample buffers 1704A" and 1704B", respectively. The in-phase samples and the quadrature phase samples are supplied to a clock recovery block 1706" that processes the time-sequential samples to generate a subcarrier clock signal that is substantially synchronous to the transitions in the Modified-Miller-subcarrier waveform. Thus, the subcarrier clock signal has a rate that corresponds to the data rate of the Modified-Miller-subcarrier waveform. Such clock recovery operations can be accomplished in many different ways as described above. The symbol clock signal, which is substantially synchronous to symbol transitions in the Modified-Miller-subcarrier waveform, is derived by up-converting the subcarrier clock signal by a factor (i.e., 2, 4, or 8) corresponding to the M value of the selected Modified-Miller-subcarrier signaling scheme.

The subcarrier and symbol clock signals generated by the clock recovery block 706" are used in four signal processing paths that operate to decode symbols. Two of the four paths process the in-phase samples (block 1732A) while the other two paths process the quadrature phase samples (block 1732B).

In the first path of block 1732A (blocks 1734A1, 1736A1, 1738A1, 1740A1), the in-phase samples that fall within the $-T/2$ to $T/2$ processing window are samplewise multiplied by an $S_0$ reference waveform generated by block 1706". The $S_0$ reference waveform generated by block 1706" varies based upon the M value (e.g., 2, 4 or 8) of the selected Modified-Miller-subcarrier signaling scheme as shown in FIGS. 15C1, 15D1 and 15E1. In the digital domain, the operations of block 1734A1 are carried out by changing the sign of the in-phase samples in accordance with the value of the corresponding part of the $S_0$ reference waveform as follows:

| Sample | Reference Waveform | Sign-adjusted Sample |
| --- | --- | --- |
| −1 | −1 | 1 (Sign Flips) |
| −1 | 1 | −1 (No Change) |
| 1 | −1 | −1 (Sign Flips) |
| 1 | 1 | 1 (No Change) |

The results of the samplewise multiplication are accumulated. In the digital domain, this operation is carried out by summing the sign-adjusted in-phase samples over the $-T/2$ to $T/2$ processing window. The result of the accumulation of block 1734A1 is stored in a storage cell in block 1736A1. The accumulation results written to the storage cell in the previous processing window (the time interval $-3T/2$ to $-T/2$) are output and added to the accumulation results for the current processing window (the time interval $-T/2$ to $T/2$) in block 1738A1. The sum denoted $Z_{c0}$ is then squared in block 1740A1. Alternatively, the absolute value of the sum $Z_{c0}$ may be calculated in block 1740A1.

In the second path (blocks 1734A2, 1736A2, 1738A2, 1740A2), the in-phase samples that fall within the $-T/2$ to $T/2$ processing window are samplewise multiplied by an $S_1$ reference waveform generated by block 1706". The $S_1$ reference waveform generated by block 1706" varies based upon the M value (e.g., 2, 4 or 8) of the selected Modified-Miller-subcarrier signaling scheme as shown in FIGS. 15C2, 15D2 and 15E2. In the digital domain, the operations of block 1734A2 are carried out by changing the sign of the in-phase samples in accordance with the value of the corresponding part of the $S_1$ reference waveform as described above. The results of the samplewise multiplication are accumulated. In the digital domain, this operation is carried out by summing the sign-adjusted in-phase samples over the $-T/2$ to $T/2$ processing window. The result of the accumulation of block 1734A2 is stored in a storage cell in block 1736A2. The accumulation results written to the storage cell in the previous processing window (the time interval $-3T/2$ to $-T/2$) are output and added to the accumulation results for the current processing window (the time interval $-T/2$ to $T/2$) in block 1738A2. The sum denoted $Z_{c1}$ is then squared in block 1740A2. Alternatively, the absolute value of the sum $Z_{c1}$ may be calculated in block 1740A2.

In block 1732B, the operations of blocks 1734A1 to 1740A2 as described above are performed on corresponding quadrature samples to thereby realize the other two processing paths.

The $S_0$ reference waveforms are shown in FIGS. 15C1, 15D1, and 15E1 and described above in detail. The $S_1$ reference waveforms are shown in FIGS. 15C2, 15D2, and 15E2 and described above in detail. In essence, the multiplication, accumulation and storage cell access operations carried out in each one of the four processing paths of blocks 1732A and 1732B are digital equivalents of a matched filter implementation over a two symbol period (i.e., over a 2T period) which is dictated by two successive processing windows that extend from $-T/2$ to $3T/2$. The squaring function (or absolute value function) maps the accumulation results of each respective path into positive numbers such the accumulation results can be effectively combined. The outputs of the squaring functions (or absolute value functions) from complementary paths are summed together. In this manner, block 1742A sums the squared accumulation results (or the absolute value of such accumulated results) for the $Z_{c0}$ processing path (blocks 1734A1, 1736A1, 1738A1, 1740A1) and the $Z_{s0}$ processing path (not shown) in block 1732B, and block 1742B sums the squared accumulation results (or the absolute value of such accumulation results) for the $Z_{c1}$ processing path (blocks 1734A2, 1736A2, 1738A2, 1740A2) and the $Z_{s1}$ processing path (not shown) in block 1732B.

The output (Z0) of adder block 1742A and the output (Z1) of adder block 1742B are supplied to comparison logic 1744 that assigns a binary value of 0 or 1 for the current symbol based thereon. Such assignment is preferably realized by the following comparison operations:

```
if (Z0 > Z1), then the current symbol
      is assigned to binary value 0;
    else the current symbol is assigned to binary value 1
endif;
where Z0 is the output of the adder block 1742A and Z1 is the output of
the adder block 1742B.
```

Controls signals, which are synchronized to the symbol clock timing, are supplied by the symbol clock recovery block 1706" to multiplexer 1746 such that bit value is output for the current symbol time period (0 to T). Such operations are repeated for successive processing windows. In this manner, the output of the multiplexer 1746 provides bit estimates for successive symbols in the Tag's Uplink Information Signal 40.

The bit estimates output by the multiplexer 1746 may optionally be loaded into a post-processing block (not shown) that processes the estimates to cancel interference (such as co-channel interference or multi-path interference) as described above.

The data recovery circuitry of the Interrogator 12 as described herein includes functionality that is activated in particular operational modes corresponding to the Tag-to-Interrogator signaling schemes (i.e., FM0-type signaling scheme or one of the three Modified-Miller-subcarrier-type signaling schemes) that can be selected by the Interrogator. Preferably, the processor 16 maintains one or more state variables that identifies the selected Tag-to-Interrogator signaling scheme, and activates the functionality of the data recovery circuitry for the particular operational mode corresponding to the selected signaling scheme in conjunction with transmission of the Query command from the Interrogator 12 to the at least one Tag 14. Such Query command dictates the signaling scheme that will be used for subsequent Tag-to-Interrogator communications.

Figure 19:
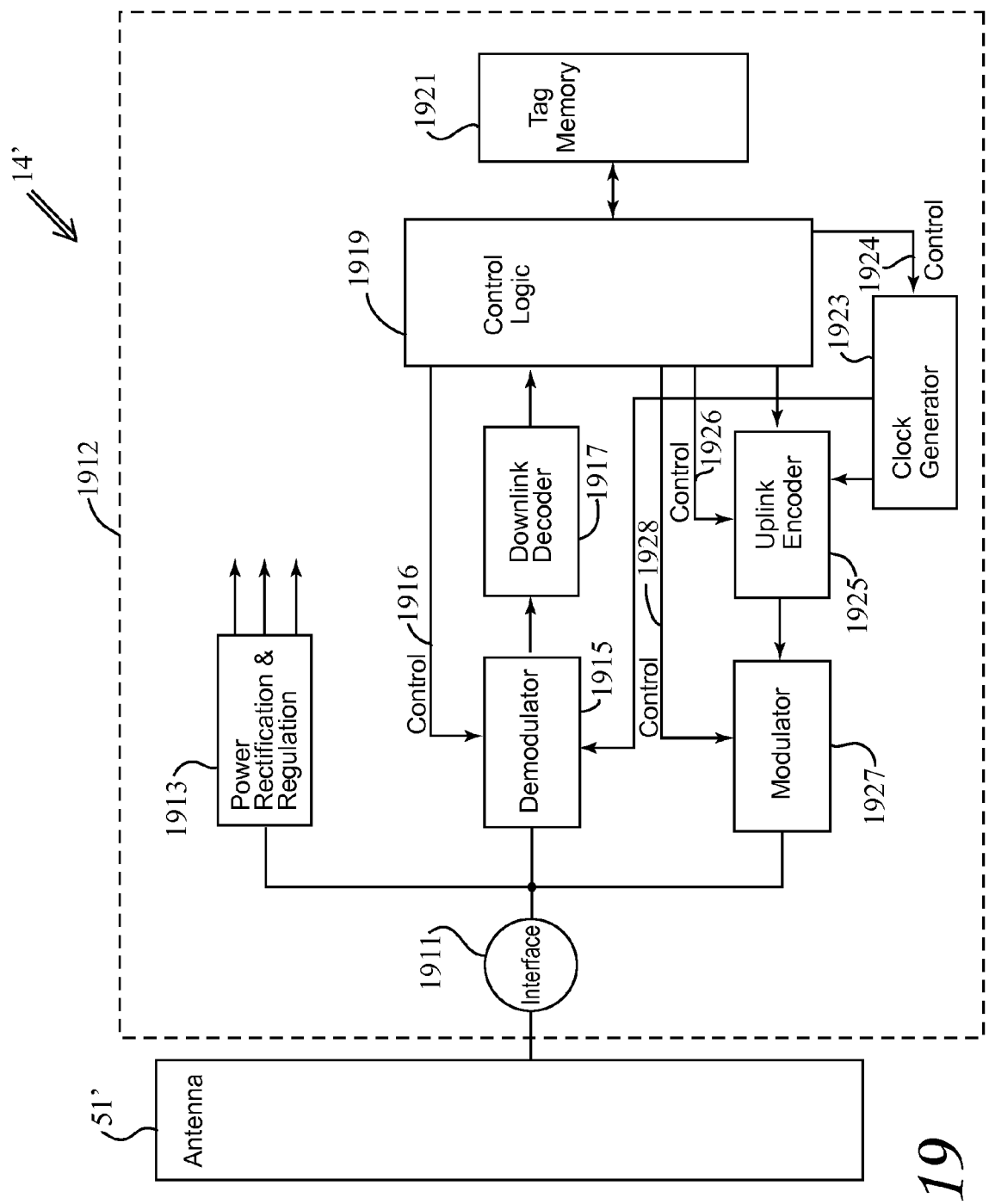
FIG. 19 is a high-level functional block diagram of an RFID tag, which can be configured to use FM0-type or Modified-Miller-subcarrier-type tag-to-Interrogator signaling in accordance with the present invention.

FIG. 19 is a high-level functional block diagram of an RFID tag 14' according to an exemplary embodiment of the present invention. The RFID tag 14' is shown to include one or more antennae 51' coupled to an integrated circuit 1912 via an interface 1911. The integrated circuit 1912 includes power rectification and regulation circuitry 1913 that is coupled to the antennae 51' by interface 1911. The power circuitry 1913 extracts power from the RF signal received at the antennae 51' and converts such power to one or more appropriate DC voltage levels for supply to the components of integrated circuit 1912.

The integrated circuit 1912 also includes a demodulator 1915 that is coupled to the antennae 51' by the interface 1911. The demodulator 1915 demodulates the RF signal received at the antenna 51'. The demodulator 1915 is capable of demodulating any one of the three modulation-types (i.e., DSB-ASK, SSB-ASK or PR-ASK) that is used for downlink communication from the Interrogator 12 to the Tag 14'. The demodulated signal components (which carry pulse-interval-encoded waveforms) are supplied to a downlink decoder 1917 which processes the demodulated signal components to recover command data and parameters encoded therein. The command data and parameters are supplied to control logic 1919, which performs a control function that transitions between operational states as dictated by the command data and parameters supplied thereto.

The control logic 1919 also interfaces to a memory 1921 that persistently stores information such as a tag identifier, access control data, operational parameters and configuration data (e.g., frequency control words that are supplied to the clock generator 1923 for dictating the center frequencies of channels used in Tag-to-Interrogator signaling), and other information. The control logic 1919 also interfaces to an uplink encoder 1925, which operates to encode information (such as the tag identifier read from memory 1921 in response to a request communicated from the Interrogator 12) in an uplink signal. This uplink signal is supplied to a modulator 1927 which operates to vary the impedance of the antenna 51' (thereby switching the reflection coefficient of the antenna 51') between two states in accordance with the uplink signal. In this manner, the antenna 51' and the modulator 1927 cooperate to transmit a backscatter signal that is modulated in accordance with the uplink signal supplied to the modulator 1927. Preferably, the modulator 1927 employs either amplitude shift keying modulation or phase shift keying modulation to carry out the backscatter modulation operations.

The clock generator 1923 provides one or more clock signals to the demodulator 15 suitable for demodulating the RF signal received at the antennae 51'. The control logic 1919 controls the operation of the demodulator 1915 and the modulator 1927 by respective control paths 1916 and 1928.

In accordance with the present invention, the control logic 1919 maintains state information that identifies the particular signaling scheme (i.e., FM0-type signaling or one of the three Modified-Miller-subcarrier signaling schemes as described herein). Such state information is updated in accordance with the particular signaling scheme identified in each Query command transmitted from the Interrogator 12 to the Tag 14'. The control logic 1919 controls the uplink encoder 1925 via control path 1926 to generate the uplink signal utilizing the particular signaling scheme (either FM0-type signaling or one of the three Modified-Miller-subcarrier signaling schemes) as identified by the state information maintained therein. As described above, this signaling scheme is selected by the Interrogator 12 as part of the Query command communicated from the Interrogator 12 to the Tag 14'. Under control of control logic 1919 via control path 1924, the clock generator 1923 provides the uplink encoder 1925 with the necessary clock signals for generating the waveforms of the selected signaling scheme, which preferably include a symbol clock signal for FM0-type signaling and a subcarrier clock signal and symbol clock signal for Modified-Miller-subcarrier signaling. In the preferred embodiment, the symbol clock signal for Modified-Miller-subcarrier signaling is derived by dividing down the subcarrier clock signal by a factor based on the M value (2, 4 or 8) of the selected Modified-Miller-subcarrier signaling scheme. For FM0-type signaling, the symbol clock signal supplied by the clock generator 1923 is utilized by the uplink encoder 1925 to generate FM0 waveforms as illustrated in FIGS. 3A-3D and described above in detail. For Modified-Miller-subcarrier signaling, the symbol clock signal supplied by the clock generator 1923 is utilized by the uplink encoder 1925 to generate a Modified-Miller baseband waveform as shown in FIGS. 4A and 4B and described above in detail. The uplink encoder 1925 generates the Modified-Miller-subcarrier waveform by multiplying the Modified-Miller baseband waveform with the subcarrier clock signal generated by the clock generator 1923 (i.e., a square wave at M times the symbol rate) as depicted in FIG. 4C and described above in detail.

Advantageously, the in-phase and quadrature signal processing paths of the Interrogator's data recovery circuit allows for accurate decoding where there is phase error between the CW RF carrier transmitted by the Interrogator 12 and the received modulated CW RF carrier, which typically results in multipath environments. Moreover, the multiplication and integration operations over the extended processing window of 2T symbol periods enhances the knowledge of the energy of the signal as well as the noise process of the communication channel. These enhancements increase the signal to noise ratio of the receiver subsystem, which allows for decreased signal power at the Tag (or increased read range of the system) in order to maintain a prescribed bit error rate. The decreased signal power at the Tag is typically realized by a smaller Tag antenna, which allows for a reduction in the size and costs of the Tag.

These enhancements result from the architecture of the data recovery circuit as well as properties of the $S_0$ and $S_1$ reference waveforms for the FM0-type signaling and Modified-Miller-subcarrier signaling that are used therein. More particularly, for FM0-type signaling, the $S_0$ reference waveform (FIG. 9A) has a period of T and the $S_1$ reference waveform (FIG. 10A) has a period of 2T. Thus, the composite $S_1$ reference waveform has a period twice that of the composite $S_0$ reference waveform. For Modified-Miller-Subcarrier signaling, the $S_1$ reference waveforms (FIGS. 15C2, 15D2, 15E2) are derived from a basis waveform (FIG. 15A2) having a period of T and the $S_0$ reference waveforms (FIGS. 15C1, 15D1, 15E1) are derived from a basis waveform (FIG. 15A1) having a period of 2T. Thus, the $S_0$ basis waveform has a period twice that of the $S_1$ basis waveform. In addition, the S0 and S1 reference waveforms used for either the FM0-type signaling or the Modified-Miller-subcarrier-type signaling are each orthogonal in nature in that its mean is zero over its respective period. In other words, the integral of each reference waveform over its respective period is zero. These properties improve the performance of the receiver in multipath environments by canceling out errors (including phase delays and amplitude variations) that arise in such multipath environments.

Moreover, the waveforms of the FM0-type signaling and the Modified-Miller-subcarrier signaling share many of the same properties. This enables the encode and decode processing for the two signaling schemes to share much of the same functionality. For software-based implementations, this reduces the code space required for encoding or decoding. For hardware-based implementations, this reduces the amount of circuitry required for encoding or decoding. These advantages are particularly important for encoding at the Tag where reduction in code space or circuitry can significantly reduce the size and costs of the Tag.

In alternate embodiments, the data recovery circuitry of the Interrogator as described herein can include functionality that performs demodulation and decoding of the Miller-modulated signaling. Such functionality is typically realized by a phase-lock loop architecture that recovers the baseband Miller waveforms from the Miller-modulated subcarrier signal and data detection circuitry that processes the baseband Miller waveforms to assign bit levels thereto. Any other suitable implementation can be used as well. Similarly, the Tags of the present invention can also include uplink signal generation circuitry that selectively operates in a third mode to generate the uplink signal in accordance with Miller-modulated signaling.

There have been described and illustrated herein an exemplary embodiment of an Interrogator and Tags of an RFID system and improved symbol decoding and encoding mechanisms therein. While particular embodiments of the invention have been described, it is not intended that the invention be limited thereto, as it is intended that the invention be as broad in scope as the art will allow and that the specification be read likewise. Thus, while an interrogator architecture that employs a shared antenna for the transmitter and receiver has been disclosed, it will be appreciated that an interrogator architecture that employs separate transmit and receive antennas coupled by a circulator can be used as well. Also, while a particular homodyne quadrature receiver architecture has been disclosed, it will be appreciated that other receiver architectures can be used as well. In addition, while particular modulation techniques and signaling formats have been disclosed, it will be understood that other modulation techniques and signaling formats can be used. Also, while the embodiments of FIGS. 8, 12, 14 and 18 described herein employ separate processing paths that perform odd symbol and even symbol processing in parallel, it will be recognized that other alternatives can be used. For example, it is possible to separate the odd symbol and even symbol processing into three phases. The first phase processes the received signal components over the processing window between –T/2 and T/2. The second phase processes the received signal components over the processing window between T/2 and 3T/2. The third phase processes the received signal components over the processing window between 3T/2 and 5T/2. The odd symbol processing is accomplished by accumulating the multiplication results over the first and second phases and adding the accumulation results of the first phase to the accumulation results of the second phase. The even symbol processing is accomplished by accumulating the multiplication results over the second and third phases and adding the accumulation results of the second phase to the accumulation results of the third phase. It will also be appreciated that the symbol decoding operations described herein can be performed over extended processing windows that are smaller than two times the symbol period T (e.g., smaller than 2T) so long as such extended processing windows are greater than T. It will therefore be appreciated by those skilled in the art that yet other modifications could be made to the provided invention without deviating from its spirit and scope as claimed.

What is claimed is:

1. In a radio frequency identification system wherein at least one RFID tag generates a signal transmitted by backscatter modulation of a radio frequency signal, the signal generated by the at least one RFID tag comprising a sequence of symbols, an Interrogator comprising:
   a transmitter that transmits the radio frequency signal; and
   a receiver that receives the signal transmitted by the at least RFID tag and processes the received signal, said receiver including a symbol decoder that operates to decode the sequence of symbols in the received signal, wherein said symbol decoder generates a set of reference waveforms that have a phase inversion at least one every symbol boundary;
   wherein the symbols of the signal generated by the at least one RFID tag each have a predetermined symbol period, the set of reference waveforms extend over respective periods that correspond to a first extended processing window, and said symbol decoder decodes a given symbol by operating on portions of a component of the received signal that are received over the first extended processing window and on the set of reference waveforms, wherein the first extended processing window and the respective periods of the set of reference waveforms are all greater than said predetermined symbol period.

2. An Interrogator according to claim 1, wherein:
said set of reference waveforms are derived by multiplying a first set of bi-phase baseband waveforms by a square wave, wherein the first set of bi-phase baseband waveforms each have a phase inversion at least on every symbol boundary and each have a first symbol rate SR1, and wherein the square wave has a rate M*SR1, where M is selected from a number of different integer values.

3. An Interrogator according to claim 1, wherein:
said set of reference waveforms comprise a second set of bi-phase baseband waveforms each having a phase inversion at least on every symbol boundary and each having a second symbol rate SR2.

4. An Interrogator according to claim 1, wherein:
a leading part of the extended processing window precedes the predetermined symbol period for a given symbol, a middle part of the extended processing window includes the predetermined symbol period for the given symbol, and an end part of the extended processing window follows the predetermined symbol period for the given symbol.

5. An Interrogator according to claim 1, wherein:
the extended processing window and the respective periods of the set of reference waveforms all have respective time durations that are substantially two times the predetermined symbol period.

6. An Interrogator according to claim 1, wherein:
said symbol decoder includes
   multiplication means for samplewise multiplication of portions of the received signal with portions of said set of reference waveforms, and
   accumulation means for accumulating results of the multiplication means over the extended processing window.

7. An Interrogator according to claim 1, wherein:
said transmitter comprises an RF signal source that generates the radio frequency signal, and
said receiver includes a quadrature mixer for demodulating the received signal, said quadrature mixer operably coupled to said RF signal source for homodyne demodulation.

8. An Interrogator according to claim 7, wherein:
said receiver includes low-pass filter circuitry that filters the output of the quadrature mixer to generate in-phase and quadrature signal components that are demodulated from the received signal.

9. An Interrogator according to claim 8, wherein:
the symbol decoder decodes a given symbol by operating on portions of both the in-phase and quadrature signal components that are received over the extended processing window.

10. An Interrogator according to claim 1, wherein:
the predetermined symbol period is dictated by communication from the Interrogator to the at least one RFID tag in the first mode of operation.

11. An Interrogator according to claim 1, wherein:
each reference waveform is orthogonal in a manner such that its mean over a period two times the predetermined symbol period is zero.

* * * * *